United States Patent [19]

Duich et al.

[11] Patent Number: 4,718,020

[45] Date of Patent: Jan. 5, 1988

[54] FAULT RECOVERY PROCEDURE FOR HEAT-REACTIVATED DRYER

[75] Inventors: Micheal B. Duich, Bellview; Bradley T. Overton; Marcel G. Verrando, III, both of Ocala, all of Fla.

[73] Assignee: Pall Corporation, Glen Cove, N.Y.

[21] Appl. No.: 739,567

[22] Filed: May 30, 1985

[51] Int. Cl.$^4$ .......................................... B01D 53/04
[52] U.S. Cl. ...................................... 364/500; 55/20; 55/163
[58] Field of Search ............... 364/500, 504, 550, 551, 364/104, 107, 103, 418, 478; 55/20, 23, 24, 163, 18

[56] References Cited

U.S. PATENT DOCUMENTS

| | | | |
|---|---|---|---|
| Re. 29,642 | 5/1978 | Kwiatkowski et al. | 364/900 |
| Re. 32,226 | 8/1986 | Fuller et al. | 364/900 |
| 2,703,628 | 3/1955 | Pompeo et al. | 183/4.7 |
| 2,944,627 | 7/1960 | Skarstrom | 183/4.7 |
| 3,448,561 | 6/1969 | Seibert et al. | 55/20 |
| 3,513,631 | 5/1970 | Seibert et al. | 55/33 |
| 3,724,169 | 4/1973 | Santeler | 55/20 |
| 3,886,528 | 5/1975 | Irani et al. | 340/173 R |
| 4,023,940 | 5/1977 | Shultz | 55/163 |
| 4,101,298 | 7/1978 | Myers et al. | 55/163 |
| 4,127,395 | 11/1978 | McKey et al. | 55/20 |
| 4,152,760 | 5/1979 | Freitas et al. | 364/107 |
| 4,157,659 | 6/1979 | Murdock | 364/558 X |
| 4,178,634 | 12/1979 | Bartlett | 364/900 |
| 4,180,860 | 12/1979 | Driscoll et al. | 364/900 |
| 4,197,095 | 4/1980 | White, Jr. et al. | 55/20 |
| 4,213,174 | 7/1980 | Morley et al. | 364/104 |
| 4,225,776 | 9/1980 | Meisner et al. | 219/492 |
| 4,227,247 | 10/1980 | Kinter | 364/900 |
| 4,247,311 | 1/1981 | Seibert et al. | 55/162 |
| 4,275,448 | 6/1981 | LeDall | 364/500 |
| 4,299,595 | 11/1981 | Benkmann et al. | 55/21 |
| 4,322,223 | 3/1982 | Christel, Jr. | 55/18 |
| 4,328,549 | 5/1982 | Avery | 364/476 X |
| 4,351,649 | 9/1982 | Ownes et al. | 55/162 |
| 4,422,859 | 12/1983 | McGee | 55/16 |
| 4,546,442 | 10/1985 | Tinker | 364/500 |

FOREIGN PATENT DOCUMENTS 8402086 6/1984 PCT Int'l Appl. .

OTHER PUBLICATIONS

"The Pall Century Series Dryers," Brochure No. PPC C-101, Pall Pneumatic Products Corporation, Ocala, Fla. (Mar. 1984) 20 pages.
"New Micro Computer Control for Amlock-DHA Dryer," Brochure No. PPS-1002, Pall Pneumatic Products Corporation, Ocala, Fla. (Feb. 1983) 4 pages.
"Pall New Energy-Saver DEA Dryer," Brochure NO. DEA-300b, Pall Pneumatic Products Corporation, Ocala, Fla. (Dec. 1982) 11 pages.

*Primary Examiner*—Gary V. Harkcom
*Assistant Examiner*—H. R. Herndon
*Attorney, Agent, or Firm*—Leydig, Voit & Mayer

[57] ABSTRACT

A method of operating a microcomputer for controlling a heat-reactivated dual-chamber gas adsorber ensures safe and reliable operation of the adsorber by recovering from disruption of the microcomputer execution sequence and sensing failure of the power control components which enable regeneration of the adsorbent. A non-volatile memory stores a code designating the "active-task" or subdivision of the adsorber cycle being controlled by the microcomputer. A reset circuit includes a watchdog timer responsive to disruption of the microcomputer's execution sequence. Upon reset of the microcomputer, the hardware components are set to an initial state and checked before resuming execution of the interrupted task. A purge circulation blower, for example, is turned on in the event that the heater cannot be turned off. The regeneration task is treated as a special case, and the non-volatile memory preferably stores an indication of whether regeneration was completed before the end of a predetermined regeneration time interval as well as how long regeneration had taken place.

23 Claims, 23 Drawing Figures

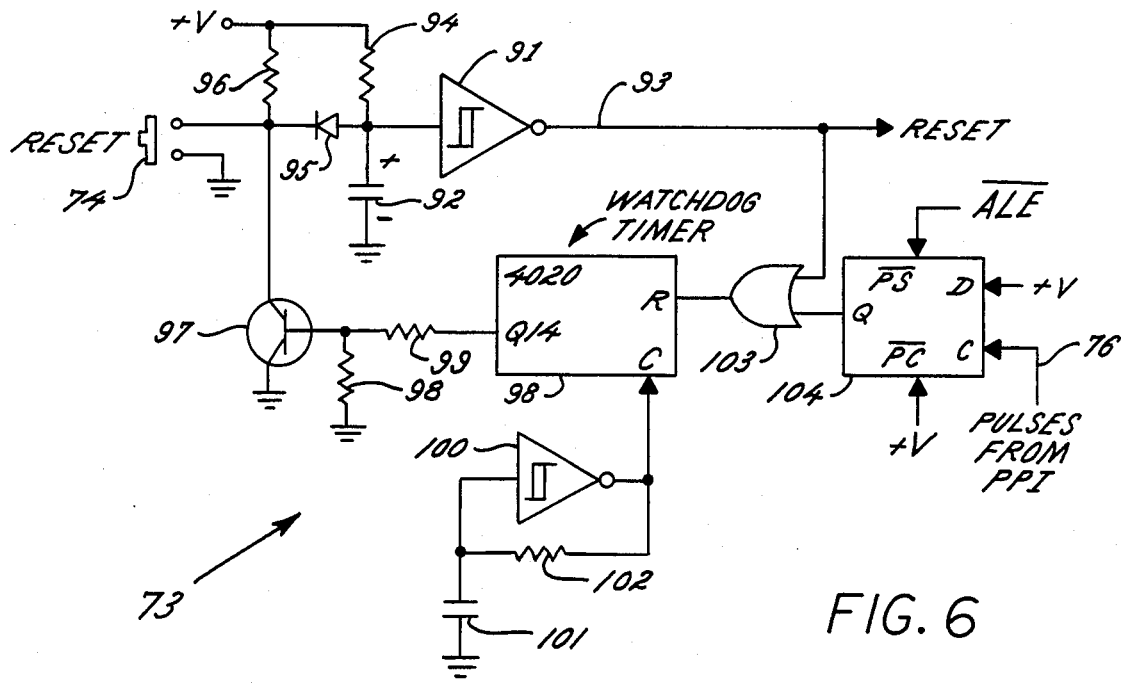
FIG. 6
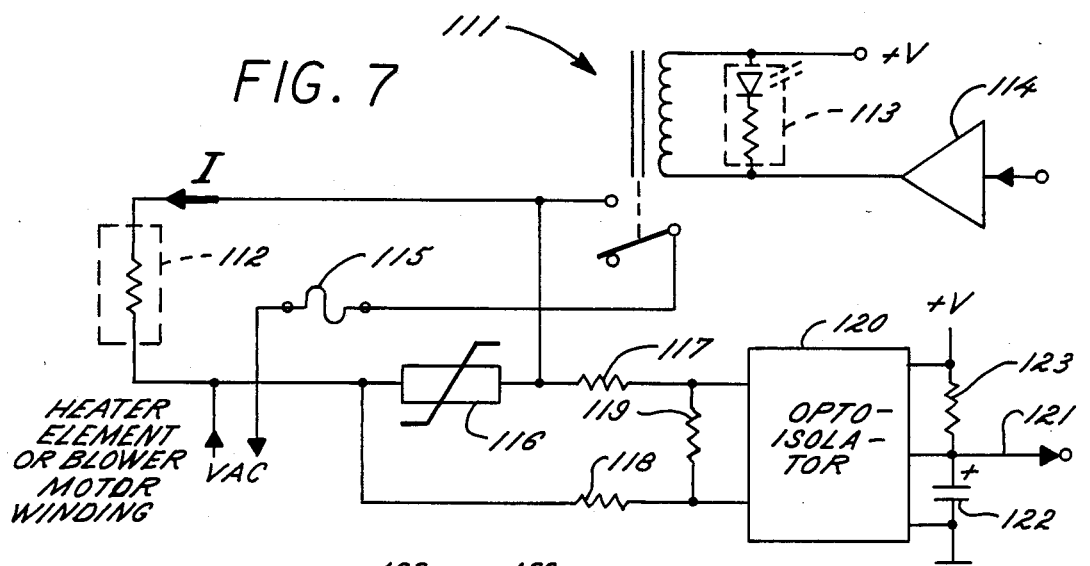
FIG. 7
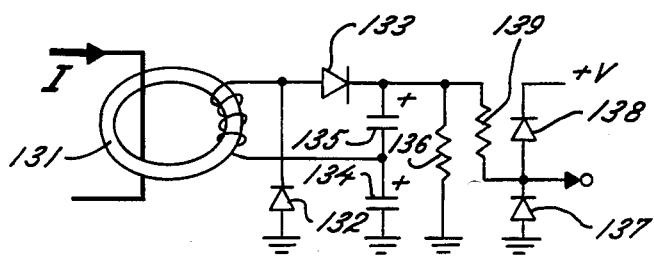
FIG. 8
FIG. 9

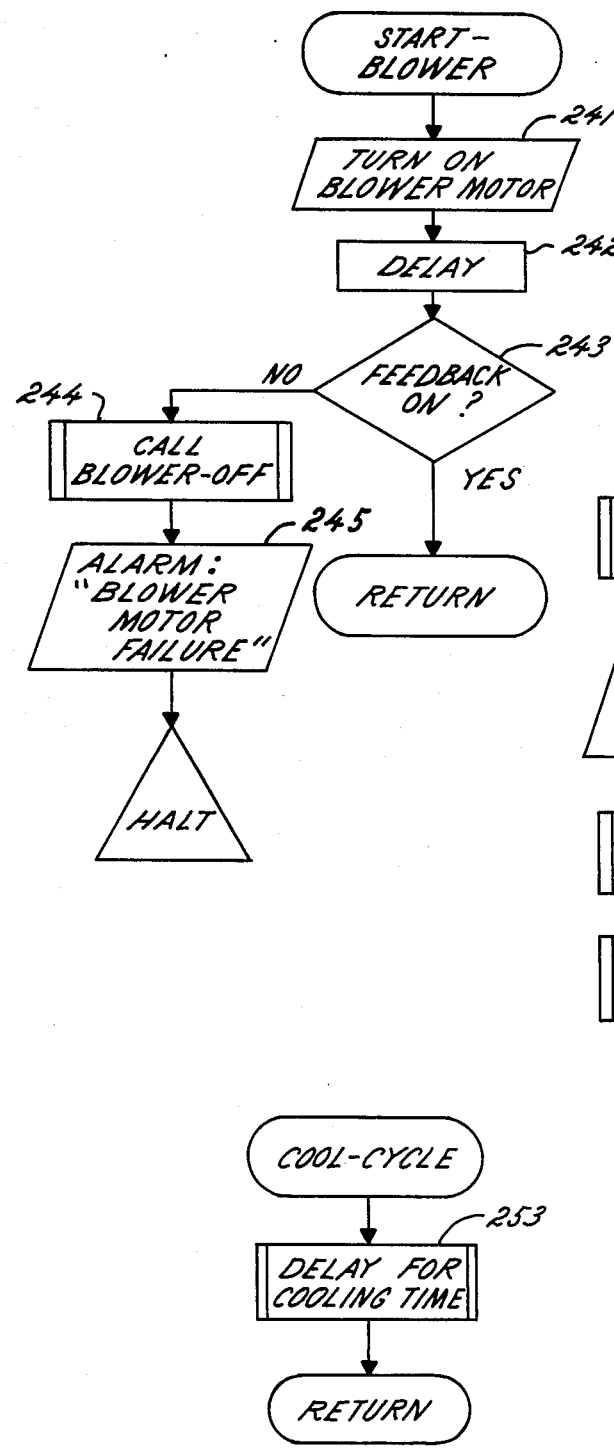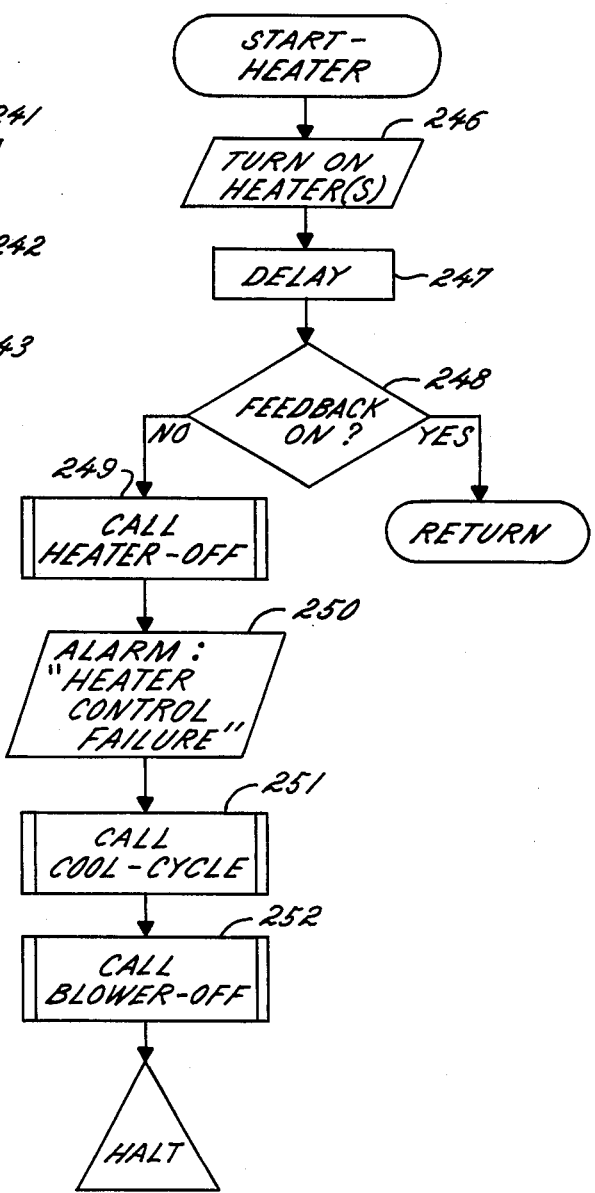
FIG. 17
FIG. 18
FIG. 19

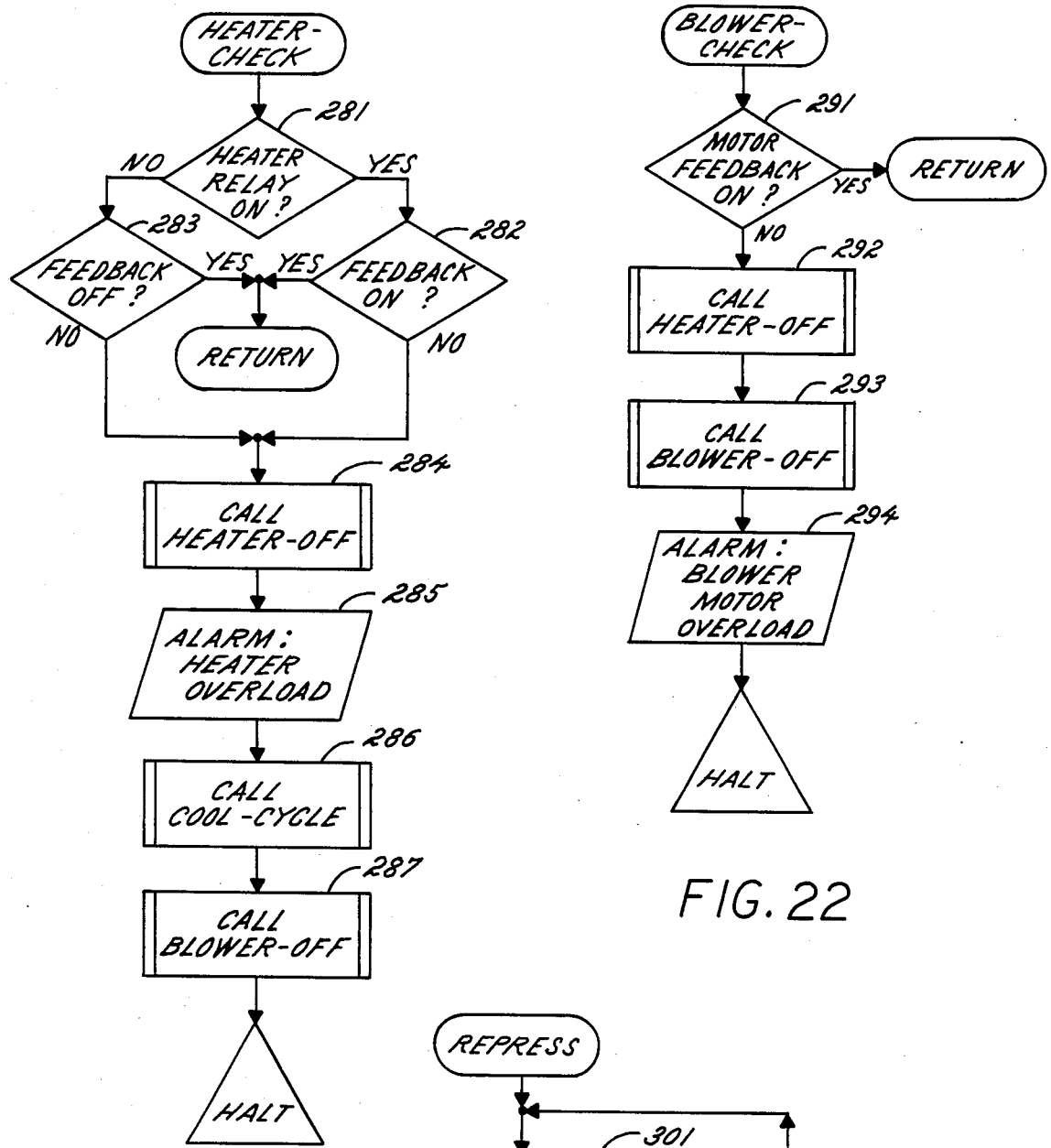
FIG. 21
FIG. 22
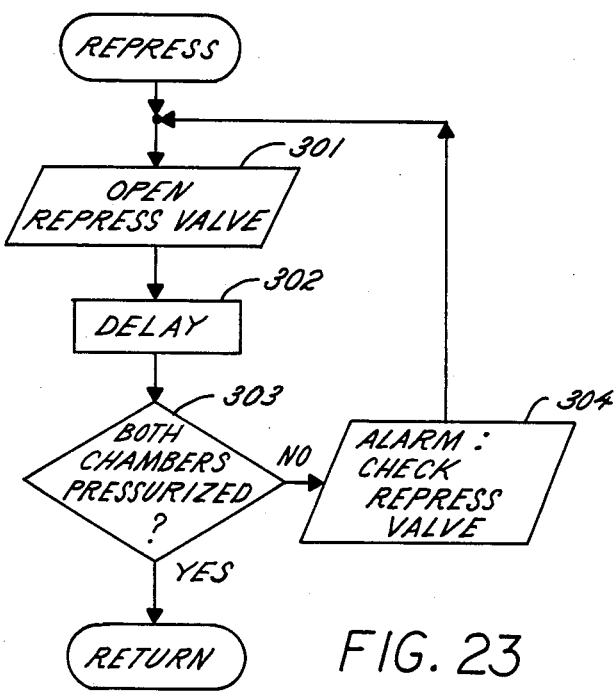
FIG. 23

FAULT RECOVERY PROCEDURE FOR HEAT-REACTIVATED DRYER

BACKGROUND OF THE INVENTION

1. Technical Field

This invention relates generally to the field of gas dryers. In particular, this invention relates to a desiccant gas dryer of the kind having a pair of sorbent or desiccant beds, wherein one bed is regenerated as the other bed adsorbs vapor.

2. Description of the Related Art

The desirability of drying air after compression is well known. A variety of systems have been developed over the years for this purpose, many of which employ two beds containing an adsorbent or desiccant material such as activated alumina. In such systems the beds alternately dry the process stream and then are regenerated either using an auxiliary source of heat in so-called heat-reactivated systems, or through conservation and use of the heat of adsorption for effecting regeneration, in so-called heaterless pressure-swing systems. In heat-reactivated systems, it has been common to use fixed cycles several hours in length, such that a bed is on adsorption for a period of time, perhaps eight hours, after which it is regenerated during the eight hour adsorption cycle for the other bed. In the heaterless systems relatively short, fixed cycle times are used, typically about four minutes for drying with four minutes allowed for regeneration while the other bed is drying the process stream. Mechanical cam timers operating solenoids which in turn operate the flow control valves have been employed for the control of such fixed cycle systems.

Typically both heat-reactivated and heaterless systems are sized for maximum contemplated loading conditions, conditions which may seldom or never be encountered during actual operation. As a result, at the end of a fixed drying cycle a bed may have adsorbed only a fraction of its moisture capacity. In the case of heat-reactivated dryers, such underutilization of the bed while on adsorption coupled with a full energy regeneration can seriously affect overall operating efficiency.

Over the years "demand" rather than fixed cycling has been employed in both heat-reactivated and heaterless dryers. Seibert, et al. U.S. Pat. No. 3,448,561 discloses a system for sensing the actual moisture content of the on-stream bed and terminating the adsorption cycle when regeneration is complete. Alternatively, the patent suggests that the moisture content of the regenerated bed can be monitored, and the purge flow can be terminated when the moisture content of the bed has dropped below a predetermined minimum. That patent discloses the use of a lithium chloride humidity sensor external to the desiccant beds with gas sampling conduit leading from the beds to the cell.

A fail-safe mechanism for the system of Seibert et al. is described by McKey et al. U.S. Pat. No. 4,127,395. To ensure continued operation of the dryer at an acceptable time cycle despite contamination of the humidity sensing element, failure of the sensing element is detected and in response thereto the dryer is automatically placed in a fixed cycle mode of operation. A failed sensor element is detected by introducing to the sensor from time to time, at an interval short enough to ensure that the desiccant bed or stream has not been exhausted, wet air from the dryer inlet.

A brute-force technique for demand control of heaterless dryers is disclosed by White, Jr. et al. U.S. Pat. No. 4,197,095. White, Jr. et al. teach that the flow rate, inlet and outlet temperatures, inlet and outlet pressures, and regenerating pressures could be sensed, and all the sensed information should be fed to a microprocessor programmed to calculate the quantity of purge and the purge flow rate, and based on these calculations, control the regeneration and cycling time. Such a control method, however, has had limited commercial application due to the relatively high cost of reliable sensors and their associated electronics.

To date, considerable success has been achieved in sensing the moisture loading on a desiccant bed by placing a capacitor directly into the bed with the sorbent or desiccant between the capacitor plates. As the moisture loading varies, the dielectric constant of the sorbent changes, such that the capacitance provides an electrical indication of the moisture loading. The use of such a capacitor probe for the control of heat-reactivated and heaterless dryers is disclosed in Gravatt [U.S. patent application Ser. No. 577,728, now U.S. Pat. No. 4,552,570].

A microcomputer-based control system for a desiccant dryer employing the capacitance probe of Gravatt is described in Tinker [U.S. patent application Ser. No. 444,502, filed Nov. 24, 1982 and now U.S. Pat. No. 4,546,442] which is herein incorporated by reference. The specific example described by Tinker is a control for a heaterless dryer. The control has an alarm relay and indicators for signalling inlet and exhaust valve malfunctions and probe failures.

Heat-reactivated adsorbers have been used for purifying as well as drying gasses. McGee, U.S. Pat. No. 4,422,859 discloses a heat-reactivated adsorber for purifying hydrogen gas. To prevent explosions, the flow of hydrogen gas and the heater are shut off in response to sensing the hydrogen gas concentration and temperature just outside of the adsorber.

Microcomputer-based systems are increasingly being used in lieu of mechanical cam or sequence drum controllers. In order to emulate such mechanical controls, the microcomputer must recover from a power failure so as to resume the control sequence at the point where power was lost. A microcomputer-based system having this feature is disclosed by Morley et al., U.S. Pat. No. 4,213,174. Power-down, power-up circuitry is said to insure an ordered and complete shutdown of the controller if any number of conditions exist, including utility AC failure and impending failure of several of the power supply voltages. Handshaking circuitry between the power supply and the remainder of the controller is said to insure that the controller maintains memory validity for all types of shutdown situations, including momentary loss of any supply voltage. The handshaking circuitry includes a watchdog circuit in FIG. 12B.

SUMMARY OF THE INVENTION

The primary object of the invention is to ensure safe and reliable operation of a microcomputer-controlled heat-reactivated dryer.

A specific object of the invention is to ensure minimal disruption of the drying cycle of a microcomputer-controlled heat-reactivated dryer as a result of a power failure or severe electrical noise.

Another object of the invention is to minimize damage to the dryer caused by component failure.

Briefly, in accordance with the invention, a non-volatile memory stores a code designating the "active-task" or subdivision of the drying cycle being controlled by the microcomputer. A reset circuit includes a watchdog timer circuit responsive to a power failure or other electrical disturbance severe enough to disrupt the microcomputer's execution of the control procedure. Upon reset of the microcomputer, the valves, heater, and blower in the heat-reactivated dryer are adjusted to initial states.

The heater is shut off, but the actual power applied to the heater is sensed to detect failure of the power regulating components. If the heater cannot be shut off, an exhaust valve in the dryer is opened and the blower is turned on in order to prevent the heater from overheating. An alarm is activated to signal the failure condition.

After the heater is shut off, the blower is shut off. The actual power applied to the blower motor is also sensed to detect failure of the power regulating components. If the blower cannot be shut off, the blower motor is turned on in order to minimize further damage to the power regulating components or motor. The alarm is activated to signal the failure condition.

The non-volatile memory is read to determine the active-task, and the "active-chamber" last used for drying the process gas stream. The desiccant chamber switching valves are reset to direct the process gas stream through the active chamber. Then the control loop of the control procedure is reentered at a particular entry point selected in response to the active-task read from the non-volatile memory.

In a preferred embodiment, the non-volatile memory includes a number of active-tasks associated with regeneration, including a "regeneration start" task in which the blower motor is turned on to circulate purge air, a "regeneration-heat" task in which the heater is turned on while the purge air is circulated, a "regeneration-cool" task in which the heater is turned off while purge air is still circulated by the blower, and a "regeneration pressurize" task in which the regenerated desiccant chamber is repressurized at the end of regeneration. The non-volatile memory further stores the elapsed "regeneration-time" during which the blower and heater were on for the previous or interrupted regeneration task. Based on the elapsed "regeneration-time" read from the non-volatile memory, the interrupted regeneration task is resumed and regeneration continues for the remainder of the regeneration time interval or until the actual completion of regeneration is detected by an exhaust thermostat.

BRIEF DESCRIPTION OF THE DRAWINGS

Other objects and advantages of the invention will become apparent upon reading the attached detailed description and upon reference to the drawings in which:

FIG. 6 is a schematic diagram of the reset circuits including the watchdog timer;

FIG. 7 is a schematic diagram of the power control circuit for controlling a single heater element or a single phase winding of the blower motor and using an optical isolator for sensing the actual voltage applied to the heater element or blower motor winding;

FIG. 8 is an alternative circuit for sensing the actual current rather than the actual voltage applied to the heater element or motor winding;

FIG. 9 is a memory map of the non-volatile memory used to store an indication of the active-task, active-chamber and the elapsed regeneration time;

FIG. 17 is a flowchart of a subroutine for starting the blower;

FIG. 18 is a flowchart of a subroutine for starting the heater;

FIG. 19 is a flowchart of a subroutine for waiting during a desired cooling period to allow the heater to cool off after being turned off;

FIG. 20 is a flowchart of a subroutine for monitoring the regeneration process while the blower and heater are on;

FIG. 21 is a flowchart for checking that the heater is either on or off as commanded;

FIG. 22 is a flowchart for ensuring that the blower is turned on during regeneration; and FIG. 23 is a flowchart for repressurizing the inactive chamber at the end of regeneration.

While the invention has been described in connection with a preferred embodiment, it will be understood that the intention is not to be limited to the particular form of the invention which has been shown, but the intention is, on the contrary, to cover the various alternative and equivalent constructions included within the spirit and scope of the appended claims.

DETAILED DESCRIPTION OF THE PREFERRED EMBODIMENT

Figure 1:
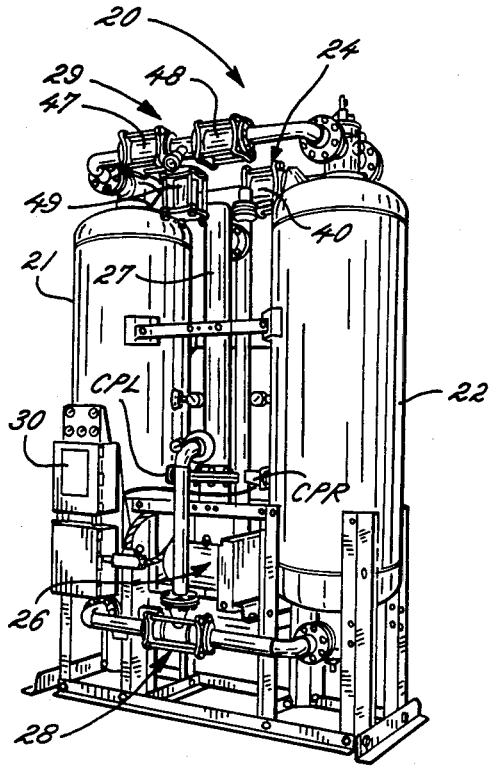
FIG. 1 is a perspective view of a blower-type heat-reactivated air dryer employing the control method of the present invention.
Figure 2:
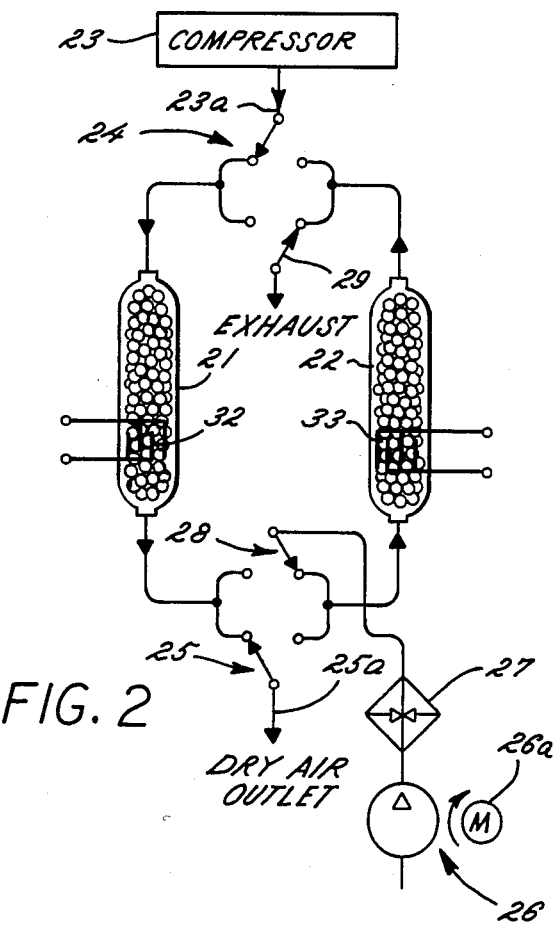
FIG. 2 is a simplified schematic diagram of the heat-reactivated dryer of FIG.1.

Turning now to the drawings, there is shown in FIG. 1 a perspective view of the main components of a blower-type heat-reactivated air dryer generally designated 20. A corresponding schematic diagram is shown in FIG. 2. The air dryer 20 has left and right desiccant beds or chambers 21, 22 for drying air received on an inlet pipe 23a from a compressor 23. An inlet valve assembly generally designated 24 alternately switches the compressed air to the active left or right chamber. Similarly an output valve assembly generally designated as 25 passes the dry compressed air to an outlet pipe 25a.

While the active chamber 21 is drying the processed air stream from the compressor 23, the other inactive chamber 22 is shown undergoing regeneration. For this purpose a blower generally designated 26 having a motor 26a directs air through a heater 27 and to the inactive chamber 22 through a check valve 28. After receiving desorbed moisture from the desiccant in the inactive chamber, the purge air stream is exhausted through an exhaust valve 29.

The positions of the valves 24, 25, 28, and 29 are shown for the left desiccant bed 21 being active to dry the air and the right desiccant bed 22 being regenerated. The valves are switched to their alternate positions in order to use the right dessicant bed 22 to dry the compressed air and to allow the left desiccant bed 21 to be regenerated.

As shown in FIG. 1, the electronic components of the control system are in enclosed in a centrally located housing 30 and the control system activates the valves 24, 25 and 29 by pneumatic lines (not shown). The control system also has left and right moisture sensing capacitance probes 32, 33 for sensing when the desiccant in the active chamber has adsorbed its rated capacity of moisture and should be regenerated. Preferably the capacitors 32, 33 are in the form of interleaved parallel metal plates, the alternate plates being electrically connected, and the metal plates being coated with a dielectric material such as Teflon in order to isolate the metal plates from the conductivity of the desiccant and associated electrolytic effects related to contaminants in the desiccant.

Figure 3:
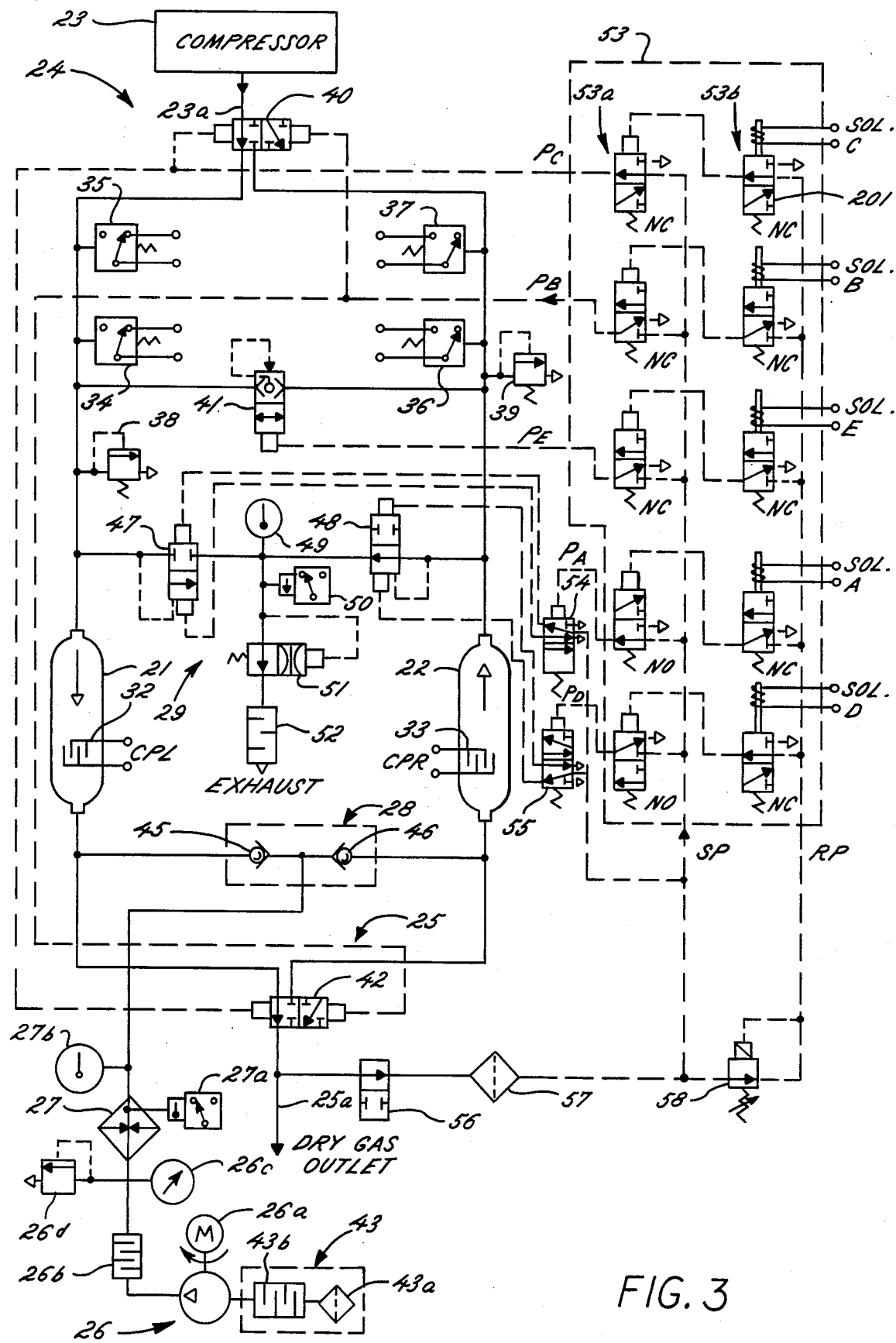
FIG. 3 is a detailed schematic diagram corresponding to the simplified schematic diagram shown in FIG. 2.

A more complete schematic diagram of the mechanical components and sensors for the heat-reactivated dryer are shown in FIG. 3. The inlet valve assembly generally designated 24 is comprised of a single three-way inlet valve 40 driven by a differential pressure input. Associated with this three-way inlet valve is a repressurizing valve 41 which permits the bed having been previously regenerated to be repressurized without substantially interrupting the flow of dry air out the outlet pipe 25a. In other words, if the inlet valve 40 were merely switched to repressurize the regenerated bed, the flow of dry air out the outlet pipe 26 could be disrupted during the time required for the pressure to build up in the regenerated bed. In the same fashion as the inlet valve assembly 24, the outlet valve assembly 25 is comprised of a single three-way outlet valve 42 which is driven by the same differential pressure that operates the three-way inlet valve 40.

Associated with the chambers 21, 22 are pressure sensing switches 34, 35, 36 and 37. Of the two pressure switches provided for each bed, one has a high pressure threshold and the other has a low pressure threshold, the thresholds being within the range of pressure encountered during normal operation. As shown, both switches are closed when their respective chamber has been completely repressurized, and both of the switches are open when their respective chamber has completely depressurized. In order to prevent excessive pressures from being generated in the desiccant chambers 21, 22 in the unlikely event of valve failure, respective pressure relief valves 38, 39 are provided.

The blower 26 receives air from a purge suction filter silencer generally designated 43 including an intake filter 43a and a muffler 43b. Also associated with the blower 26 is an outlet silencer or muffler 26b, a purge pressure indicator 26c, and a pressure relief valve 26d. The pressure relief valve 26d opens in the event that the flow of purge air is blocked, for example if the check valves 28 or exhaust valves 29 become stuck. The opening of the relief valve 26d in this case prevents over-running of the blower 26.

Associated with the heater 27 is a thermostat 27a and a temperature indicator 27b. The preferred temperature for the thermostat 27a is 450° F.

The check valve assembly 28 includes two separate check valves 45, 46 for directing the flow of purge air to the depressurized chamber 21 or 22. Similarly the exhaust valve assembly generally designated 29 includes two separate two-way valves 47, 48 for dumping the respective chambers at the start of regeneration.

The temperature of the purge exhaust gives an indication of whether the desiccant has been regenerated. Since desorption of water vapor requires a good deal of energy, the temperature of the purge exhaust during desorption is much lower than the temperature of the purge air entering the chamber undergoing regeneration. Therefore, an increase in the purge exhaust temperature occurs when the entire chamber of desiccant has been regenerated. To detect this condition, the purge exhaust is monitored by a temperature switch 50 having a threshold of about 180° F. Also, the purge exhaust temperature is indicated by a temperature gauge 49.

The dump exhaust is passed to a dump flow restrictor 51 which limits the exhaust air flow to a reasonably small rate so that the desiccant beads or pellets in the dumped bed are not "fluidized" when the respective exhaust valve 47, 48 is first opened at the start of regeneration. An exhaust muffler 52 reduces the aerodynamic noise associated with the dumping of the pressurized bed.

The inlet valve 40, repressurizing valve 41, outlet valve 42, and exhaust valves 47, 48 are operated by pneumatic pressures $P_C$, $P_B$, $P_E$, $P_A$, and $P_D$ generated by a solenoid valve and a pneumatic relay assembly 53 including a set of pneumatic relays 53a operated by electromagnetic solenoid valves 53b. The use of pneumatic relays 53a in addition to solenoid valves 53b permit the solenoid valves to be operated by very low relay coil currents of about 250 milliamperes. The pneumatic relays 53a switch air at the high pressure SP of the dry gas outlet 25a as supplied through a valve 56 and a prefilter 57. The solenoid valves 53b, however, operate at a relatively low regulated pressure RP of up to 100 PSI above atmospheric pressure, as set by an adjustable pressure regulator 58, and have a very low flow capacity when they are open. The solenoid valves 53b are all normally closed (NC) while the pneumatic relays 53a are either normally open (NO) or normally closed (NC) as designated in FIG. 3. The exhaust valves 47, 48 are driven by respective normally open ones of the pneumatic relays 53a via respective intermediate pneumatic relays 54 and 55. The intermediate relays 54 and 55 are provided so that the exhaust valves 47, 48 are operated by differential pressures.

It should be noted that the detailed diagram in FIG. 3 differs from the simplified schematic of FIG. 2 since the exhaust valves 47 and 48 in FIG. 3 are separately controllable via solenoids A and B. In practice it is desirable to have both solenoids in the OFF position to close both of the exhaust valves during repressurization of the chamber just having been regenerated, as well as during the "hold" portion of the dryer cycle as described below.

Figure 4:
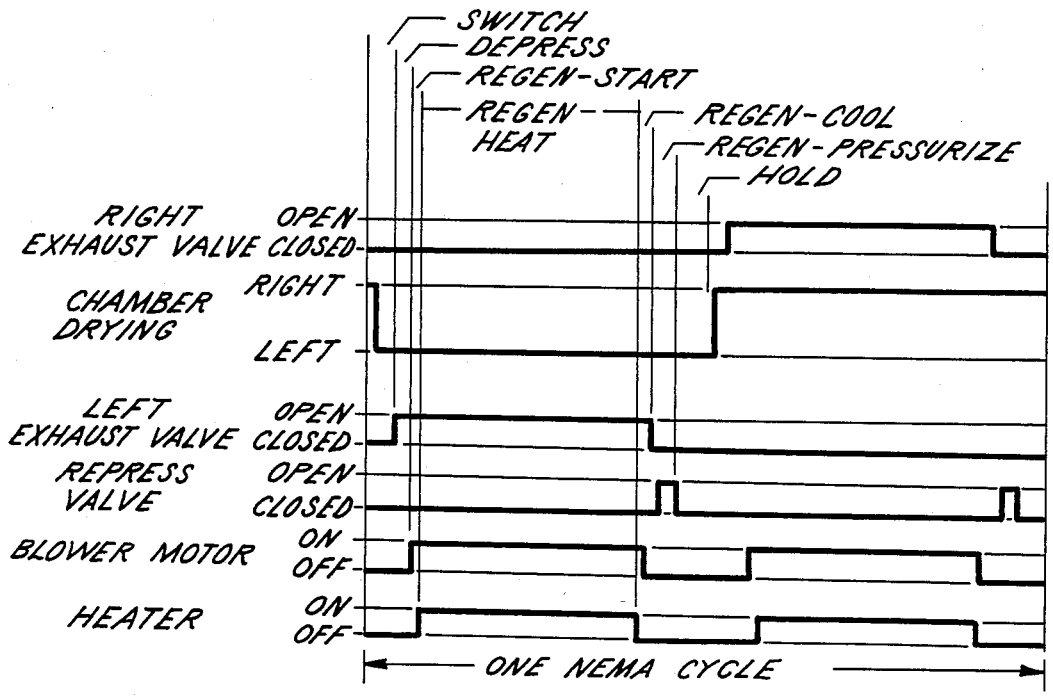
FIG. 4 is a timing diagram showing the "active-tasks" in the drying cycle.

Turning now to FIG. 4 there is shown a timing diagram of the dryer cycle. A complete dryer cycle, known as one "NEMA" cycle, encompasses the time required to switch from one chamber for adsorption to the other and back again. Therefore, it includes one complete period of the "chamber drying" signal.

In accordance with an important aspect of the present invention, the dryer cycle is subdivided into a number of subdivisions hereinafter called "active-tasks" which define reentry points in the control procedure in the event that execution of the control procedure is interrupted. At the start of the dryer cycle, in an active-task called "switch" the inlet valves 24 and outlet valves 25 are toggled so that the inlet flow of purge gas shifts from one chamber to the other. Next, in the "depress" or depressurization task, the respective exhaust valve is opened to blow-down the inactive chamber. At the start of regeneration, in the "regen-start" task the blower motor 26a is turned on before the heater 27 is turned on. After purge airflow is established, in the "regen-heat" task the heater is turned on for at most a predetermined regeneration time. The elapsed time during the "regen-heat" task is recorded in non-volatile memory, so that if the regen-heat task is interrupted, the heating process may be resumed and continued for the remainder of the desired heating time. At the end of this desired heating time, in the "regen-cool" task the heater 27 is turned off but the blower motor 26a is kept on for a certain time to ensure that the regenerated desiccant bed cools down prior to switching of the beds. At the end regeneration, in the "regen-pressurize" task, both of the exhaust valves 47, 48 are closed and the repressurization valve 41 is temporarily opened to repressurize the desiccant chamber having been regenerated. After repressurization, however, the chambers are not immediately switched. Instead, during a "hold" task, the moisture probe 32, 33 in the active chamber undergoing adsorption is used to determine whether the desiccant in the active bed has reached its full capacity to adsorb moisture. The control procedure waits until the capacity of the desiccant in the active chamber is used up and regeneration is required. At that time the "switch" task is again executed followed by the other tasks in sequence as described above.

Figure 5:
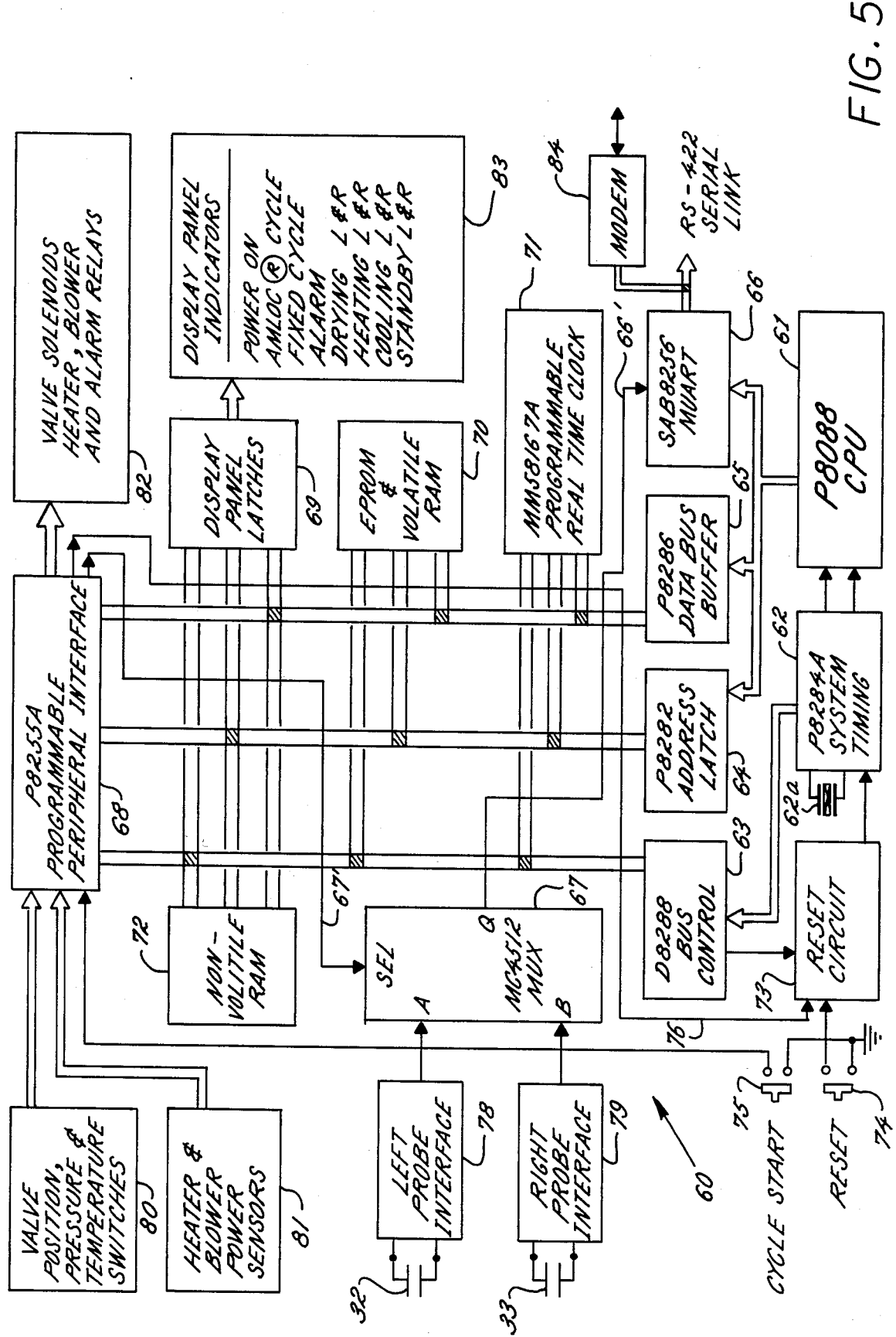
FIG. 5 is a block diagram of the control system showing the components of the microcomputer.

Turning now to FIG. 5, there is shown a block diagram of the preferred control apparatus or system for practicing the method of the present invention. The heart of the system is a microcomputer generally designated 60 using Intel Corporation 8000 series integrated circuits. Specifically, the microcomputer 60 includes an Intel part number P8088 central processing unit (CPU) 61, a system timing integrated circuit 62 part number P8284A controlled by a quartz crystal 62a, a bus control integrated circuit 63 part number D8288, an address latch 64 part number P8282, a data bus buffer 65 part number P8286, a multifunction universal asynchronous receiver-transmitter (MUART) 66 part number SAB8256, a programmable peripheral interface 68 part number P8255A, display panel latches 69 for example part number P8255A, and working memory 70 including electrically programmable read-only memory (EPROM) and volatile scratch-pad random access memory (RAM). The EPROM stores the control program executed by the microcomputer 60 and is preferably part number D2764A, and the volatile RAM is preferably part number C2186. The microcomputer also includes a programmable real time clock 71 such a part number MM58167A.

To carry out the procedure according to the invention, the computer 60 includes non-volatile random access memory 72. The applicants have used electrically alterable non-volatile RAM part number D2817-W and have found that this particular component performs satisfactorily. The applicants believe, however, that due to the limited number of guaranteed "write cycles" for the electrically alterable memory, it is preferable to use battery-backup CMOS static RAM. Part number D2817-W also required a separate power supply that would not be necessary if the battery-backed CMOS RAM were used instead.

To respond to disruptions in the execution of the control procedure, the microcomputer 60 has a specially designed reset circuit 73 further described below in connection with FIG. 6. This reset circuit includes a watchdog timer as well as a manual and a "power-on" reset circuit. The manual reset circuit is responsive to a push-button reset switch 74. During normal operation the watchdog timer is periodically reset by a dynamic signal including pulses from the programmable peripheral interface 68 along an output line 75. This dynamic signal is generated by the microcomputer's execution of write operations interspersed in the control program. Also associated with resetting the microcomputer 60 is a cycle start push-button switch 75 which provides an input to the programmable peripheral interface 68. As will be described below, if the reset switch 74 is activated when the operator depresses the cycle start switch 75, then upon reset the microcomputer 60 will clear the non-volatile RAM 72 and start at the beginning of the NEMA drying cycle shown in FIG. 4.

As will become apparent below, the fault recovery procedure of the present invention is distinguished from microcomputer systems which attempt to execute a power-down sequence before loss of power since the present invention operates under the assumption that the system must recover regardless of the cause of the disruption. The integrity of the non-volatile RAM 72 and the ability of the watchdog circuit to detect disruption of normal execution is assured by using full address decoding for the non-volatile RAM 72 and the programmable peripheral interface 68.

In order to control the heat-reactivated dryer 20 and to report the status of the control to an operator, the computer 60 is interfaced to a number of input and output devices. In order to perform regeneration only as frequently as necessary, the microcomputer 60 has left and right probe interfaces 77 and 78, respectively, which generate frequencies responsive to the capacitance of the probes. The precise manner in which the capacitance probes are interfaced to the microcomputer 60 is further described in Tinker [U.S. application Ser. No. 444,502, now U.S. Pat. No. 4,546,442] herein incorporated by reference.

For counting the frequencies from the probe interfaces 77, 78, Tinker describes using a programmable timer-counter integrated circuit, part No. P8253, having a separate respective counter for each of the probe interfaces. In the microcomputer 60 of FIG. 5, however, a programmable timer-counter integrated circuit is not needed because the MUART 66 includes a number of programmable timer-counters which can be used instead. Specifically, the MUART 66 is programmed to provide a 16 bit counter for counting the frequency from a selected one of the probe interfaces 78, 79. To select the desired one of the probe interfaces, a multiplexer 57 has a select input line 67' receiving one output bit of the programmable peripheral interface 68. The multiplexer 67 is, for example, CMOS part No. MC4512. The multiplexer receives the respective probe frequencies on its data inputs (A), (B) and the selected frequency on its data output (Q) is fed to the counter clock input line 66' of the MUART 66.

In order to determine the present state of the heat-reactivated dryer 20, the system is provided with a number of sensors including valve position switches, pressure and temperature switches 80, and heater and blower power sensors 81 which are further described below in connection with FIGS. 7 and 8. The valve position switches are Hall effect sensors such as Texas Instrument Part No. TL172C responsive to magnets fastened to the valve elements. The switches 80 and sensors 81 feed input signals to the programmable peripheral interface 68. The programmable peripheral interface 68 is also programmed to provide a number of outputs to the valve solenoids 53b (see FIG. 3), and the heater, blower and alarm relays, which are all generally designated 82 in FIG. 5. The circuit for a single relay is shown and described further below in connection with FIG. 7.

To summarize the status of the dryer, the microcomputer 60 includes a number of indicator 83 driven by the display panel latches 69. The display panel latches drive twelve light-emitting diodes 83 for indicating whether power is on, whether the system is operating in a moisture control "AMLOC® cycle" or a fixed cycle, whether the alarm relay has been energized, and whether the left or right chamber is undergoing drying, heating, cooling, or "standby" during the "hold" task. The display panel indicators 83 also include alphanumeric indicators which display an error code whenever the control procedure goes into a "halt" state, as further described below. These error messages indicate, for example, the particular malfunction that was detected and caused the system to enter the "halt" state.

To provide remote diagnostics, the MUART 66 may be provided with a telephone dial-up modem 84 which, for example, would permit a remote computer to read the status indicators and the the error code.

Turning now to FIG. 6, there is shown a schematic diagram of the reset circuit generally designated 73. The reset signal for the microcomputer is generated by a Schmitt trigger 91 such as one-half of a Signetic's part number LM556. The Schmitt trigger 91 is responsive to the voltage on a time delay capacitor 92 which has a value of, for example, 1 microfarad. During the "power-on" condition, the capacitor 92 is discharged, thereby generating a logic high on the reset line 93, until the capacitor 92 is charged up by a current sourcing resistor 94. The current sourcing resistor 94 has a value, for example, of 470K ohms.

To provide a manual reset function, the reset pushbutton switch 74 is connected to the capacitor 92 via a directional diode 95. The directional diode 95 normally isolates the capacitor 92 from a load resistor 96 of an NPN transistor 97 providing a watchdog timer reset. The load resistor 96, for example, has a value of 4.7K ohms and the transistor 97 is part number 2N2222A. The watchdog timer includes a CMOS binary counter 98, such as standard part number 4020, which is interfaced to the transistor 97 through resistors 98 and 99. The resistors 98 and 99, for example, have values of 4.7K ohms.

The time interval of the watchdog timer 98 is set by its divide-down ratio of $2^{14}$ or 16,384 and the frequency of the clock signal generated by a second Schmitt trigger 100. The frequency of the clock signal is set by a capacitor 101 shunting the input of the Schmitt trigger 100 to ground, and a feedback resistor 102. The capacitor 101 has a value, for example, of 0.01 microfarads and the resistor 102 has a value of 4.7K ohms.

So that the watchdog timer 98 will generate a reset pulse when the timer 98 "times out", the reset signal on line 93 is fed back to the reset input R of the timer through a logical OR gate 103 such as standard TTL part number 74LS32. The watchdog timer 98 is also reset by pulses generated by a delay-type flip-flop 104 in response to the positive-going transitions on the signal on line 76 from the programmable peripheral interface 68 (see FIG. 5). The delay-type flip-flop 104 is clocked by the pulses on line 76, and has positive supply voltage +V (of 5 volts) applied to its D input and its pre-clear (PC) input asserted low. The delay-type flip-flop 104 is periodically cleared by the microcomputer's address line enable signal (ALE) asserted low applied to the flip-flop's pre-set asserted low input. The flip-flop 104 is, for example, standard TTL part number 74LS74A.

Turning now to FIG. 7, there is shown a schematic diagram for one particular relay 11 which drives, for example, a heater element or blower motor winding 112. The relay 111 is, for example, part number W76URCPCX-14. To indicate whether the coil of the relay is energized, the coil is shunted by a light-emitting diode 113 such as part number HLMP-3600. The relay coil is driven by an open-collector output of a driver 114 such as part number MC1413D. The driver 114 is activated by an output of the peripheral interface (68 in FIG. 5). The circuit to the heater element or blower motor winding 112 includes a protective fuse 115 which is, for example, a 125 volt, 3 ampere line fuse. It should be appreciated that to obtain the desired level of heating power a number of heating elements are used in the heater (57 in FIG. 2). In order to protect the relay contacts from transients, the heater element 112 is shunted by a varistor 116 such as part number V130L10A.

In accordance with an important aspect of the invention, the voltage applied to the heater element or blower motor winding 112 is sensed and an indication of this voltage is fed back to an input of the microcomputer 60 (FIG. 5). For this purpose the heating element 12 is shunted by a voltage divider network comprising series resistors 117 and 118, a shunt resistor 119, and an opto-isolator 120. Series resistors 117 and 118 are, for example, 10K ohms and the shunt resistor 119 is, for example, 1.2K ohms. The optical isolator 120 is, for example, part number HCPL-3700. In order to provide a logic signal from the output of the opto-isolator, the output, appearing on line 121, is filtered by an electrolytic capacitor 122 having a value of 22 microfarads, working in conjunction with a pull-up resistor 123 of 1.6K ohms. The output of the optical isolator 121 must be filtered because its input is the alternating voltage generated across the shunt resistor 119. Line 121 is connected to an input of the peripheral interface (68 in FIG. 5).

In addition to sensing the voltage across the heater element or motor winding 112, the current through the heater element or motor winding 112 could be sensed by a current transformer circuit such a shown in FIG. 8. In this circuit a current sensing transformer 131, for example fashioned from a toroidal inductor, generates an alternating voltage proportional to the current through a primary winding having one or more turns. This voltage is rectified by a doubler circuit comprising directional diodes 132 and 133 working in conjunction with filter capacitors 134 and 135 and a shunt resistor 136. A logic signal is obtained by clamping the output of the detector to between ground and the supply voltage +V using clamping diodes 137 and 138 working in conjunction with a current limiting resistor 139. It is believed, however, that the sensing of the actual current through the heating element or motor winding 112 is unnecessary since an open circuit failure of the heater element or motor winding is extremely unlikely. Rather, circuit failure is likely to occur by the opening of the protective fuse 115 or the persistent opening or closing of the relay contacts. All of these anticipated failure modes can be detected through the use of the optical isolator 120 of FIG. 7.

Turning now to FIG. 9, there is shown a memory map of the non-volatile random access memory 72. In addition to the "active-task", "active-chamber", and "regen-time", the non-volatile memory 72 stores the cumulative run-time and cumulative hold-time of the dryer. The cumulative run-time represents the length of time that the dryer has been operating since the last "cycle start" of the dryer as will be further described below. The cumulative hold-time represents the sum of the hold-times since the last cycle start. The ratio of the cumulative hold-time to the cumulative run-time represents the reserve capacity of the dryer. Although the cumulative run-time and cumulative hold-time are not used for control purposes, they provide a kind of statistical summary of the dryer's operation.

Figure 10:
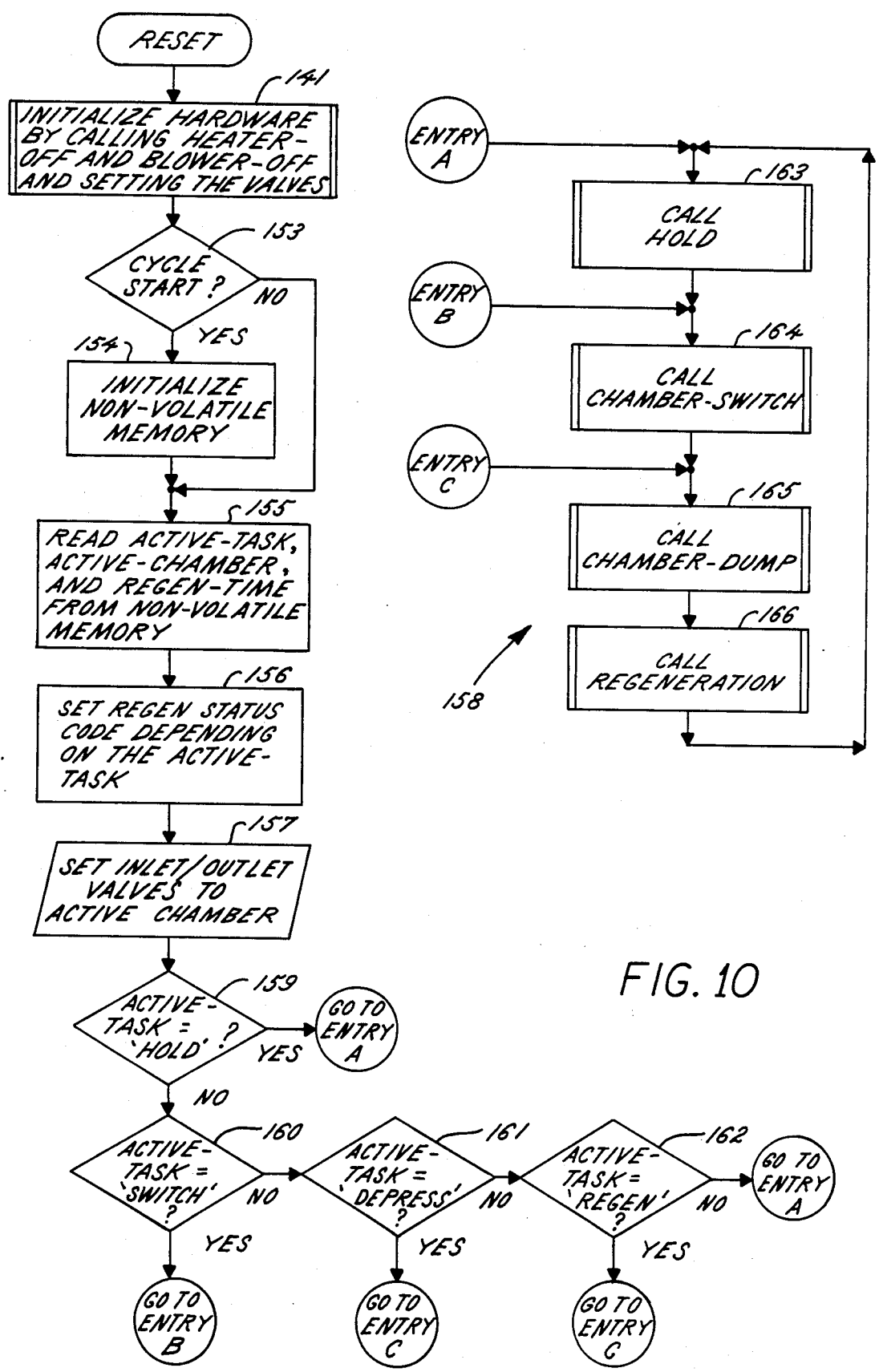
FIG. 10 is a flowchart of the reset sequence and control loop executed by the microcomputer in FIG. 5 to perform the fault recovery procedure of the present invention.
Figure 12:
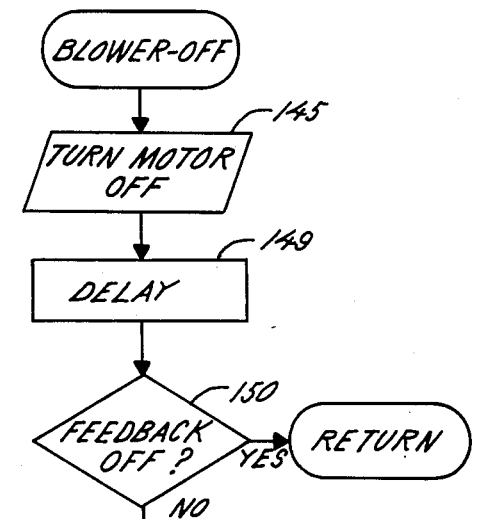
FIG. 12 is a flowchart of a subroutine for turning off the blower motor.
Figure 11:
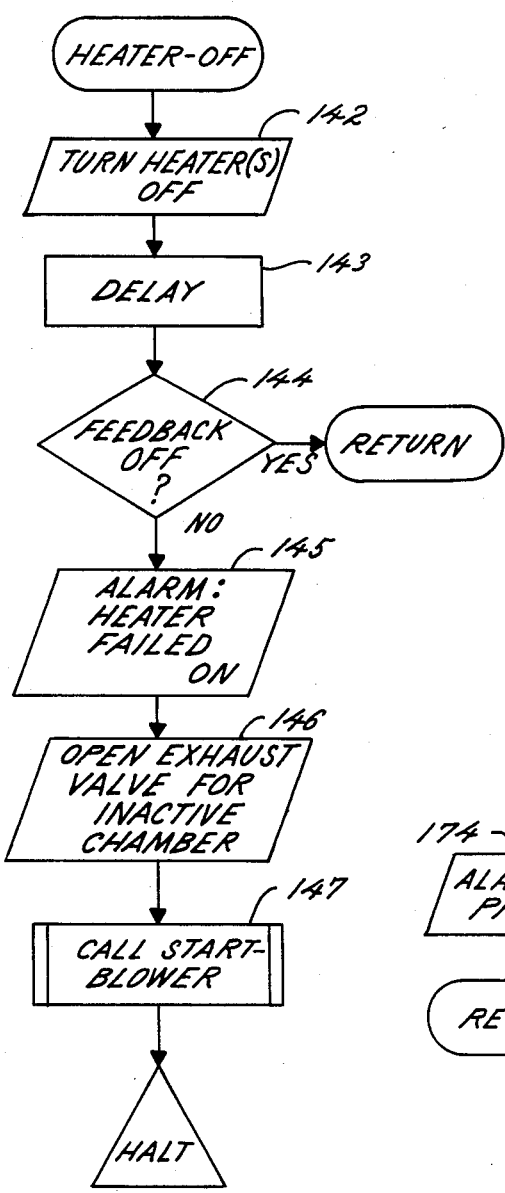
FIG. 11 is a flowchart of a subroutine for turning off the heater.

Turning now to FIG. 10, there is shown a flowchart of the reset procedure and the entry points to the dryer control loop. In the first step 141 the dryer hardware is initialized to an inactive condition. The subroutine HEATER-OFF of FIG. 11 is called to turn off the heater and then the subroutine BLOWER-OFF of FIG. 12 is called to turn off the blower. Then solenoids E, A, and D (53b in FIG. 3) are turned off to close the repressurization valve 41 and the exhaust valves 47 and 48.

Turning for the moment to FIGS. 11 and 12, the subroutines HEATER-OFF and BLOWER-OFF will be described due to their importance in the initialization step 141 of FIG. 10. In the first step 142 of the HEATER-OFF subroutine of FIG. 11, the heater elements 112 are turned off by deenergizing their respective relays 111 (see FIG. 7). It is especially important, however, to use feedback to determine whether the relays 111 have in fact opened the circuit to the heater elements 112. For this purpose, after a three second delay in step 143 to account for the time for opening of the relays, in step 144 the feedback from the optical isolators 120 sensing the voltage to the heater elements is checked to insure that the feedback signals are off. If so, then execution returns. Otherwise, in step 145 the alarm relay (82 in FIG. 5) is turned on and the error code described above notes that the heater failed on. Then in step 146 the exhaust valve for the inactive chamber is opened and in step 147 the subroutine START-BLOWER of FIG. 17 is called to turn on the blower. It is especially important that in the event of the heater failing on as detected in step 144, an exhaust valve is opened and the blower is started in order to circulate air through the heater to prevent the heater from over heating.

Turning to FIG. 12, there is shown a flowchart of the BLOWER-OFF subroutine. In the first step 148 a signal is sent to the programmable peripheral interface 68 (FIG. 5) to deenergize the relay (111 in FIG. 7) which energizes the blower motor (26a FIG. 2). (If the motor 26a is a three-phase motor, a relay may be provided for each phase.) In step 149 a three second delay is provided to account for the time for the relay to open. Then in step 150 the feedback from the optical isolator (120 in FIG. 7) which senses the voltage applied to the motor is tested in step 150 to determine whether the motor has in fact been turned off. If so, execution returns. Otherwise, in step 151 a signal is sent to the programmable peripheral interface (68 in FIG. 5) in order to energize the relay (111 in FIG. 7) which turns on the motor. In this way the motor is turned back on in order to prevent any further damage to the relay or the motor. This further damage could be caused, for example, by arcing relay contacts or by operating the blower motor at reduced voltage levels (or from only a single phase winding if the blower motor is a three-phase motor). In step 152 the error condition is signalled by activating the alarm relay (82 in FIG. 5) and by setting the error code to indicate that the motor failed on. Execution of the control procedure then halts until an operator can correct the problem and restart the control sequence by activating the reset switch (74 in FIG. 5).

Returning to FIG. 10, now that the hardware has been initialized by turning the heater and blower off and closing the repressurization and purge valves, in step 153 the programmable peripheral interface (68 in FIG. 5) is read to determine whether the cycle start switch (75 in FIG. 5) is activated. If so, then in step 154 the non-volatile memory (72 in FIG. 5) is initialized. By clearing the non-volatile memory, the active-task is set to the first task of "switch", the active-chamber is set to "left", and the regeneration time, cumulative run-time, and cumulative hold-time memory locations are all cleared.

Regardless of whether the cycle start switch was activated, in step 155 the active-task, active-chamber, and regeneration time are read from the non-volatile memory (72 in FIG. 5) in order to determine how to start or resume the control procedure for the dryer. In step 156 a regeneration status code is set depending upon the active-task. As will become apparent below, the regeneration procedure, including a number of active-tasks, has a common entry point, and the regeneration status code is used to perform different steps during regeneration depending upon the regeneration task that was interrupted. In step 156 the regeneration status code is initially set to zero, and if the active-task read from the non-volatile memory in step 153 is a regeneration task, the regeneration status code is set to indicate the particular regeneration active-task. Specifically the regeneration status code is set to "S" for the "regen-start" task, "H" for the "regen-heat" task, "C" for the "regen-cool" task, and "P" for the "regen-pressurize" task. Next in step 157 the inlet and outlet valves (24 and 25 in FIG. 2) are set to select the active chamber. Therefore the inlet flow of process air is directed to the active chamber.

Depending upon the active-task, a particular one of the entry points to the dryer control loop generally designated 158 is selected. If the active-task is "hold", then in step 159 the first entry point "A" is selected. If the active-task is "switch", then in step 160 the second entry point "B" is selected. In step 161, if the active-task is "depress" then the third entry point "C" is selected. The third entry point "C" is also selected in step 162 if the active-task is any of the regeneration tasks. Step 162 is performed, for example, by conditionally jumping to entry point "C" unless the regeneration status code set in step 154 is zero. Otherwise, the first entry point "A" is selected by default.

In order to cyclicly control the dryer as shown in FIG. 4, the dryer control loop repetitively and sequentially calls subroutines for waiting until the desiccant in the active chamber has adsorbed its full capacity of moisture, switching the active chamber, depressurizing the other inactive chamber, and regenerating the inactive chamber. Starting at the first entry point "A" in the control loop 158, in step 163 the subroutine HOLD is called to wait until the respective capacitance probe 32, 33 in the active chamber indicates that the desiccant in the active chamber needs to be regenerated. The subroutine HOLD is further described below in connection with FIG. 13. In the next step 164 which is also entered from the second entry point "B", the subroutine CHAMBER-SWITCH is called to switch the active chamber. The subroutine CHAMBER-SWITCH is further described below in connection with FIG. 14. Next, in step 165, which is also entered from the third entry point "C", the subroutine CHAMBER-DUMP is called to depressurize the inactive chamber. The subroutine CHAMBER-DUMP is further described below in connection with FIG. 15. After depressurizing the inactive chamber, the desiccant in the inactive chamber is reactivated in step 166 by calling the subroutine REGENERATION. The REGENERATION subroutine is described further below in connection FIG. 16.

Figure 13:
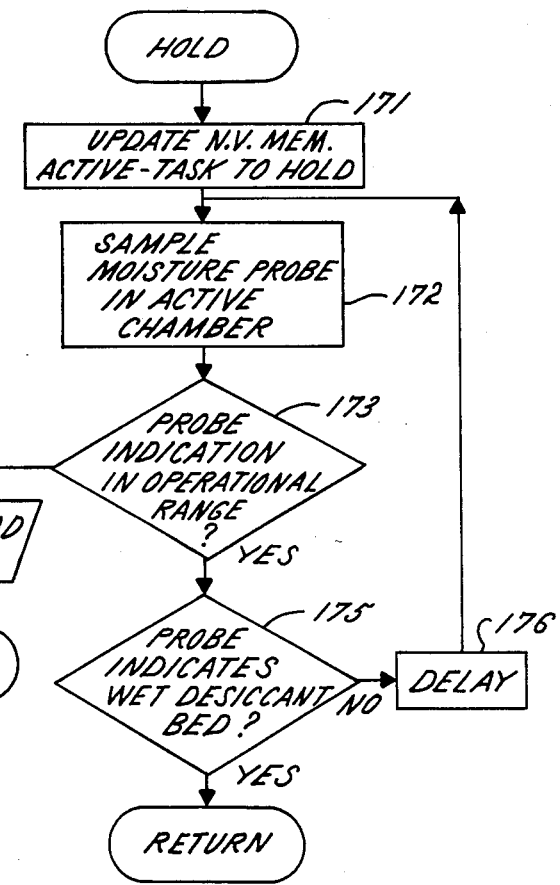
FIG. 13 is a flowchart for holding the reactivated desiccant chamber until the active chamber undergoing adsorption uses up its capacity to adsorb water vapor.

Turning now to FIG. 13, there is shown a flowchart of the HOLD subroutine. In the first step 171 the non-volatile memory (72 in FIG. 5) is updated by setting the active-task to "hold". Then in step 172 the moisture probe 32, 33 in the active chamber is sampled. In step 173 the probe indication is compared to high and low threshold limits to determine whether it is within a predefined operational range. If not, then in step 174 the alarm relay is activated and the error code is set to indicate a "bad probe" condition. Execution does not halt after step 174; rather, execution returns since then the dryer may operate on a fixed cycle. In this fixed cycle, the hold time will be a minimum so that the dryer will be operated at its maximum capacity for adsorbing moisture from the process airstream.

If in step 173 the probe indication was within the predefined operational range, then in step 175 the probe indication is compared to a predetermined threshold to determine whether the active desiccant bed is wet. If so, execution returns so that the bed is regenerated. Otherwise, after a delay of ten seconds in step 176, execution returns to step 172 to repetitively sample the moisture probe in step 172 until step 175 indicates that the desiccant bed is wet and regeneration is required.

Figure 14:
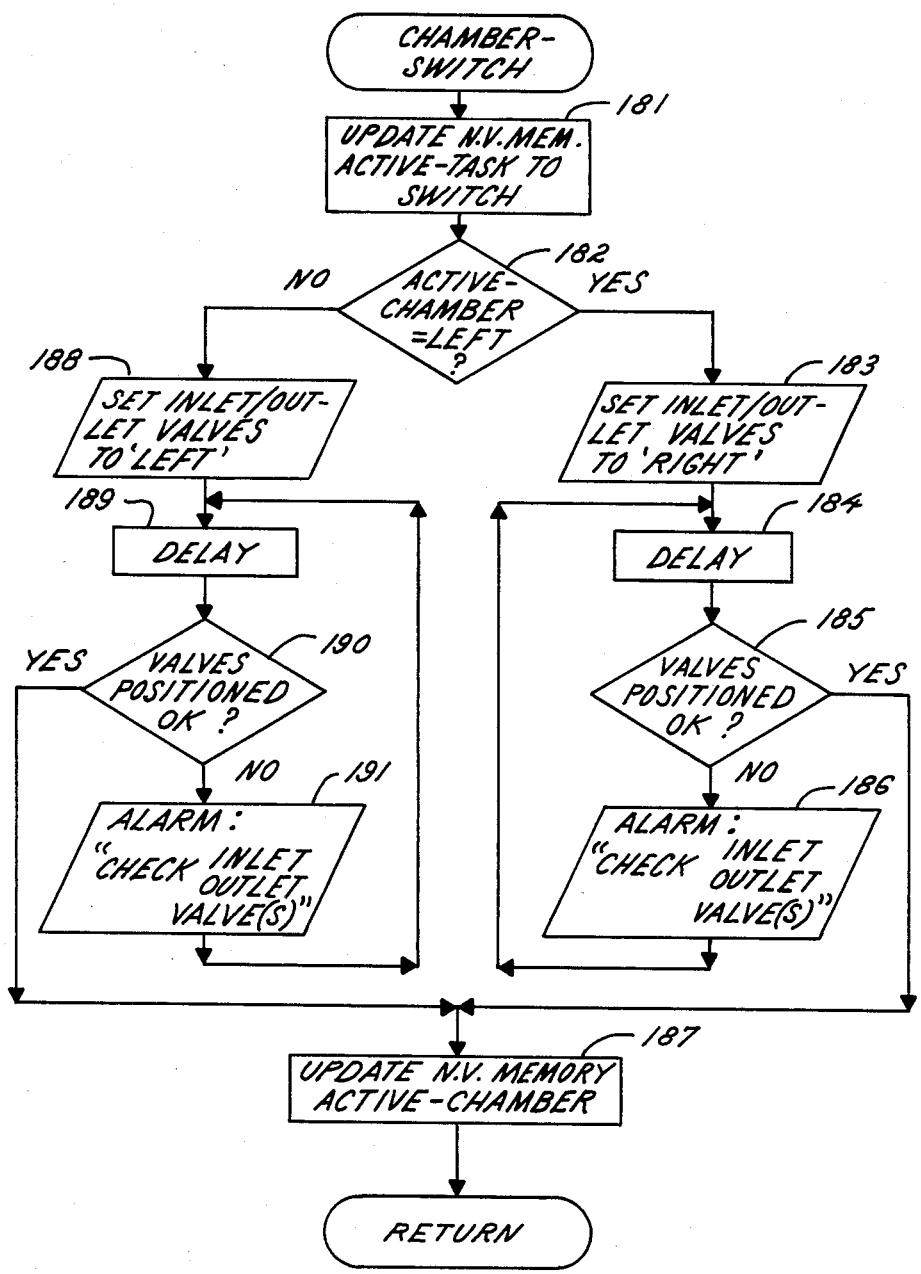
FIG. 14 is a flowchart for switching the inlet flow of process gas from one chamber to the other in order to switch the chamber being active.

Turning now to FIG. 14 there is shown a flowchart of the CHAMBER-SWITCH subroutine. In the first step 181 the non-volatile memory (72 in FIG. 5) is updated by setting the active-task to "switch". Then in step 182 execution branches depending upon whether the active-chamber is left or right. If the active-chamber is left, then the inlet flow of process air is switched to the right chamber 22. In step 183 the inlet and outlet valves (24, 25 in FIG. 2) are switched to direct the inlet flow of process air to the right chamber. After a delay in step 184 of ten seconds, the valve position is sensed in step 185 by reading indications from the Hall effect switches in the valves (80 in FIG. 5). If the valves have not switched, as tested in step 185, then the alarm relay is activated in step 186 and the error code is set to indicate that the inlet and outlet valves should be checked. Instead of halting, execution jumps back to step 184 under the assumption that the valves might eventually move to their desired positions. Once the valves assume their desired positions, in step 187 valve switching is registered in non-volatile memory by changing the active-chamber indication.

If in step 182 the active-chamber was found to be the right chamber, then the inlet flow of process air is switched over to the left chamber 21 by performing steps 188, 189, 190, 191, and 187, in a similar fashion as described above for steps 183, 184, 185, 186, and 187.

Figure 15:
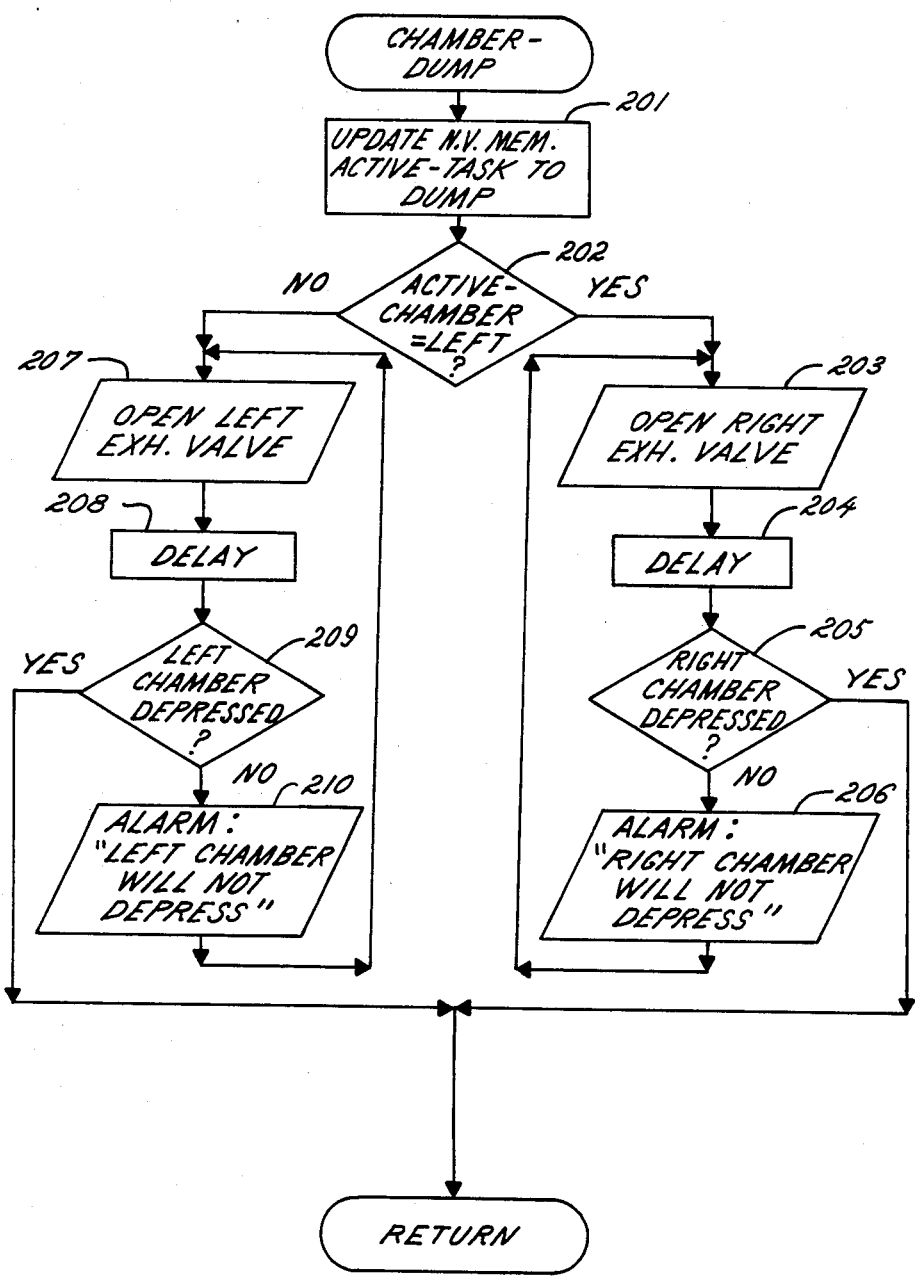
FIG. 15 is a flowchart of a subroutine for exhausting or dumping a chamber prior to depressurization.

Turning now to FIG. 15, there is shown a flowchart of the CHAMBER-DUMP subroutine. In the first step 201 the non-volatile memory (72 in FIG. 5) is updated by setting the active-task to "dump". To determine which chamber should be dumped prior to regeneration, the active-chamber indication in non-volatile memory is inspected in step 202. If the active-chamber is the left chamber, then the right chamber 22 should be dumped. For this purpose in step 203 the right exhaust valve (48 in FIG. 3) is opened. After a delay in step 204 of thirty seconds to permit the right chamber to depressurized, in step 205 the right pressure switches 36 and 37 are read to determine whether the right chamber is fully depressurized. If not, then in step 206 the alarm relay is reactivated and the error code is set to indicate that the right chamber will not depressurize. Instead of halting, execution returns to step 203 in another attempt to open the right exhaust valve. Once the right chamber depressurizes, execution returns.

If in step 202 it was found that the active chamber was not the left chamber, then steps 207, 208, 209 and 210 are performed in order to depressurize the left chamber in a similar fashion as described above in steps 203, 204, 205 and 206.

Figure 16:
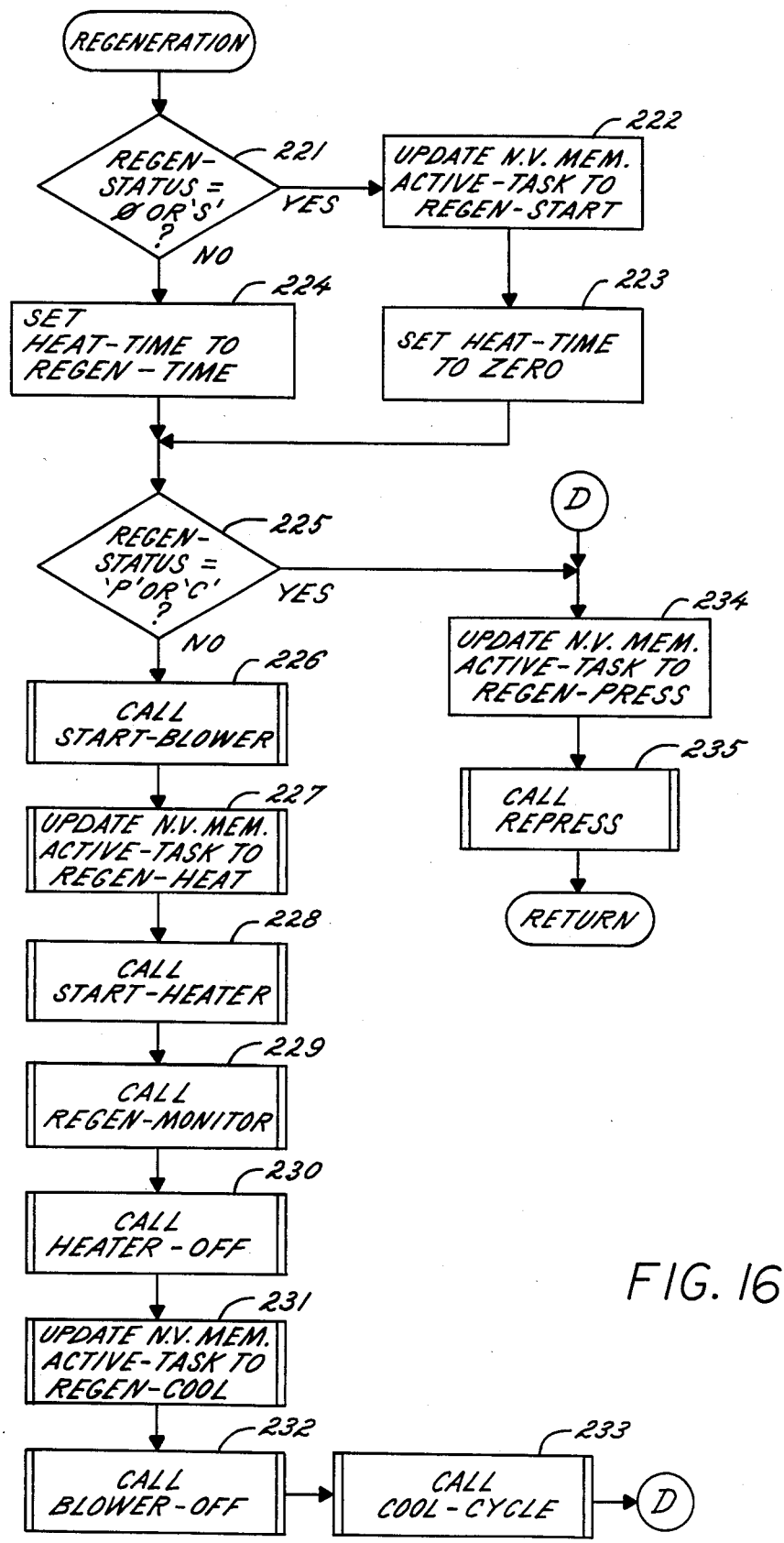
FIG. 16 is a flowchart of a subroutine for regenerating the inactive chamber.

Turning now to FIG. 16, there is shown a flowchart of the REGENERATION subroutine. In the first step 221 the regeneration status code is inspected to determine whether the status is zero or "S", indicating that the previous regeneration was not interrupted or indicating that just the beginning of the previous regeneration was interrupted. If so, then in step 222 the non-volatile memory is updated by setting its active-task to regen-start. Next, in step 223 the value of the program variable "heat-time" is set to zero. The program variable "heat-time" is used as a timer to count out the time in seconds during which the heater is on and the desiccant in the inactive chamber is regenerating. If in step 221 the regeneration status code was not equal to zero or "S", then in step 224 the value of the regen-time is read from the non-volatile memory and the value of the program variable heat-time is set to the value of the regen-time. Next, in step 225 the regeneration status code is compared to "P" and "C" to determine whether the prior regeneration task was interrupted at the end of regeneration. If not, then the blower and heater must be turned on to regenerate the desiccant in the inactive chamber. For this purpose in step 226 the subroutine STARTBLOWER of FIG. 17 is called to turn on the blower. Next in step 227 the non-volatile memory is updated by setting the active-task to regen-heat. The heater is turned on in step 228 by calling the subroutine START-HEATER of FIG. 18.

In order to regenerate the desiccant for at most a predetermined time interval, a subroutine REGEN-MONITOR is called in step 229. The REGEN-MONITOR subroutine is further described below in connection with FIG. 20. After regeneration for at most this predetermined time interval, the heater is turned off in step 230 by calling the subroutine HEATER-OFF already described above in connection with FIG. 11. To mark the end of the heating task, in step 231 the non-volatile memory is updated by setting the active-task to regen-cool. In step 232 the blower is turned off by calling the BLOWER-OFF subroutine already described above in connection with FIG. 12. To provide a time delay for cooling, the subroutine COOL-CYCLE is called in step 233. The subroutine COOL-CYCLE is described further below in connection with FIG. 19.

After cooling or in response to the regen-status code being "P" or "C" as tested in step 225, the non-volatile memory is updated in step 234 by setting the active-task to regen-pressurize. To repressurize the inactive chamber, in step 235 the subroutine REPRESS is called. The subroutine REPRESS is further described below in connection with FIG. 23.

Turning now to FIG. 17 there is shown a flowchart of the START-BLOWER subroutine. In the first step 241 the blower is turned on by energizing the blower motor relay (111 in FIG. 7). After a delay in step 242 of three seconds, the optical isolator sensing the voltage across the motor winding (120 in FIG. 7) is sensed in step 243 to check whether the blower motor has actually been energized. If so, execution returns. If not, then in step 244 the subroutine BLOWER-OFF is called to de-energize the blower motor. This is done to minimize potential damage to the motor windings and relay contacts. Also, in step 245 the alarm relay is activated and the error code is set to indicate a blower motor failure. Execution halts until the fault is corrected by the operator and the operator activates the reset switch (74 in FIG. 5).

Turning now to FIG. 18 there is shown a flowchart of the subroutine START-HEATER. In the first step 246 the heater relay or relays (111 in FIG. 7) are energized to turn on the heater element or elements. Then, after a delay of three seconds in step 247, the optical isolator or isolators (120 in FIG. 7) are sensed in step 248 to determine whether power has been applied to the heater element or elements. If so, execution returns. Otherwise, the subroutine HEATER-OFF is called in step 249 to deenergize the relay or relays 111 in an attempt to minimize potential damage to the relay or relays. Then in step 250 the alarm relay is activated and the error code is set to indicate a heater control failure. As a further precaution, the blower motor is kept on for the predetermined cooling time in step 251 by calling the subroutine COOL-CYCLE of FIG. 19. Before halting, the blower is turned off in step 252 by calling the subroutine BLOWER-OFF.

Turning now to FIG. 19 there is shown a flowchart of the subroutine COOL-CYCLE. In the first and single step 253 execution waits for a predetermined delay sufficient for cooling down the desiccant in the inactive chamber so that the desiccant regains its adsorption ability. The cooling time is, for example, thirty minutes.

Figure 20:
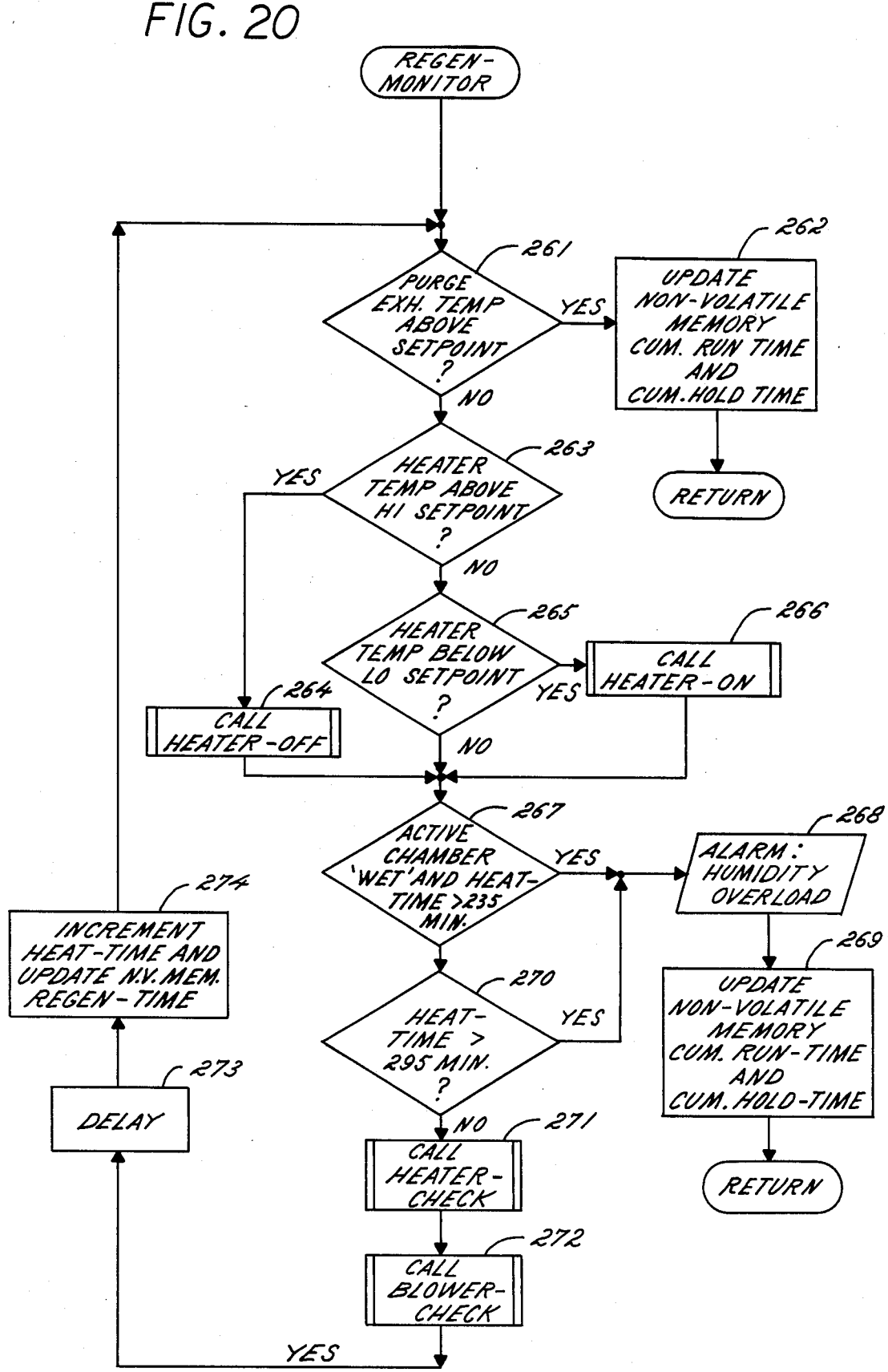

Turning now to FIG. 20 there is shown a flowchart of the REGEN-MONITOR subroutine. In the first step 261 the purge thermostat switch (50 in FIG. 3) is read to determine whether the purge exhaust temperature is above the 180° F. set point of the switch. If so, the high purge exhaust temperature indicates that the desiccant in the inactive chamber has been completely regenerated. Before returning, however, in step 262 the cumulative run-time and the cumulative hold-time in the non-volatile memory are updated. Preferably the programmable real time clock (71 in FIG. 5) is used for determining the run-time and the hold-time. In step 262, for example, the real time clock (71 in FIG. 5) is read. Moreover, this reading from the last time that the REGEN-MONITOR subroutine was called is obtained from memory. By comparing these two real-time clock readings, the run-time starting from the last update of the cumulative run-time is calculated, and the increase is added to the cumulative run-time stored in the non-volatile memory to obtain the new cumulative run-time value. This new value is then written into the non-volatile memory. Also, by subtracting the heat-time (accumulated in step 274 below) from the increase in the run-time, the increase in hold-time is determined. The cumulative hold-time is read from the non-volatile memory and added to the increase in the hold-time and the sum is then written back into the cumulative hold-time location of the non-volatile memory. After the non-volatile memory is updated in this fashion, execution returns.

If in step 261 the purge exhaust temperature was not above 180° F. set point, then in step 263 the thermostat switch 27a is read to determine whether the heater temperature is above the high set point. The thermostat switch 27a is of the kind having adjustable hysterisis and two independent switch contacts responsive to respective high and low set points. The high set point is several degrees, such as five degrees, above the nominal set point of 450° F. If the temperature exceeds the high set point, then in step 264 the HEATER-OFF subroutine of FIG. 11 is called. If not, then in step 265 the thermostat switch is again read to determine whether the temperature is below its low set point, which is several degrees, such as five degrees, below the nominal set point. If so, then in step 266 the heater is turned on by calling the START-HEATER subroutine of FIG. 18.

In step 267 the moisture probe in the active chamber undergoing adsorption is sensed to determine whether the active chamber has become wet when the heat-time is greater than 235 minutes. If so, the active chamber is adsorbing moisture faster than the inactive chamber is desorbing moisture during regeneration. To signal this humidity overload condition, the alarm relay is energized in step 268 and the error code is set to indicate the humidity overload. In step 269 the cumulative run-time and hold-time in the non-volatile memory is updated as in step 262 above, and execution returns.

If in step 267 the active chamber was not wet when the heat-time exceeded 235 minutes, then in step 270 the heat-time is compared to 295 minutes. If the heat-time is greater than 295 minutes, then the inactive chamber being regenerated has been overloaded or possibly the purge exhaust thermostat 50 has failed. Therefore execution jumps to step 268 to signal the humidity overload condition.

If steps 267 and 270 do not indicate a humidity overload, then in step 271 the subroutine HEATER-CHECK is called to insure that the heater is being turned on and off properly. The subroutine HEATER-CHECK is further described below in connection with FIG. 21. Next, in step 272, the subroutine BLOWER-CHECK is called to insure that the blower is still turned on. The subroutine BLOWER-CHECK is further described below in connection with FIG. 22.

After a delay of one second in step 273 the heat-time is incremented by one second in step 274 and the regen-time in the non-volatile memory is updated by being set to the incremented heat-time. Execution then loops back to step 261.

Turning now to FIG. 21 there is shown a flowchart of the HEATER-CHECK subroutine. In the first step 281, the programmable peripheral interface (68 in FIG. 5) is read to determine whether the heater relay is energized. If so, then in step 282 the optical isolator for the heater (120 in FIG. 9) is read to check whether the feedback is on. If so, then the heater is operating properly and execution returns. Similarly, if step 281 finds that the heater relay is not energized, in step 283 the optical isolator for the relay is read to determine whether the feedback is off. If the feedback is off, the heater is operating properly and execution returns.

If either of steps 283 or 282 determine that the heater is not operating properly, then for safety purposes in step 284 the subroutine HEATER-OFF of FIG. 11 is called in an attempt to turn off the heater. Next in step 285 the alarm is activated and the error code is set to indicate a heater overload. In step 286 the subroutine COOL-CYCLE is called to provide a cooling time before the blower is turned off in step 287 by calling the BLOWER-OFF subroutine of FIG. 12. Execution then halts until the operator corrects the error and activates the reset switch (74 in FIG. 5).

Turning now to FIG. 22 there is shown a flowchart of the BLOWER-CHECK subroutine. In step 291 the optical isolator sensing the voltage applied to the blower motor winding (120 in FIG. 7) is read to determine whether the motor feedback is on. If so, the blower motor is properly energized. If not, in step 292 the subroutine HEATER-OFF of FIG. 11 is called to turn off the heater to prevent a heater overload. Then in step 293 the subroutine BLOWER-OFF is called in order to prevent further damage to the contacts of the motor relay (111 in FIG. 7). Finally in step 294 the alarm relay is activated and the error code is set to indicate a blower motor overload before execution halts. Execution may resume after the operator corrects the blower malfunction and activates the reset switch (74 in FIG. 5).

Turning to FIG. 23 there is shown a flowchart of the REPRESS subroutine for repressurizing the inactive chamber just having undergone regeneration. In the first step 301 the repressurization valve (41 in FIG. 3) is opened and a delay of 5 minutes in step 302 provides sufficient time for repressurization. Then in step 303 the pressure switches (34, 35, 36 and 37 in FIG. 3) are sensed to check that both chambers are repressurized. If not, in step 304 the alarm is activated and the error code is set to indicate that the repressurization valve should be checked. Execution jumps back to 301 in an attempt to open the repressurization valve.

Once step 303 indicates that both chambers are pressurized, execution returns.

In view of the above, the microcomputer controlling the heat-reactivated dryer is reset by the watchdog timer regardless of how proper execution was disrupted. The recovery procedure ensures that execution of the periodic control procedure or control loop (158 in FIG. 10) is entered as quickly as possible at the interrupted point. Before resuming the periodic control procedure, the mechanical components of the dryer are set to a predetermined initial state and the electrical power regulating components are checked for failure modes which require operator attention and immediate corrective action. The blower, for example, is turned on in the event that the heater cannot be shut off.

The regeneration portion of the dryer cycle is treated as a special case and actions are taken to resume regeneration with a minimum of energy use. The non-volatile memory stores in its "regen-time" and "active-task" memory locations an indication of how long regeneration had taken place and whether regeneration was terminated prior to the expiration of the 295 minute regeneration time interval in response to the purge exhaust thermostat (50 in FIG. 3). By inhibiting regeneration in the event of a "hold" active-task indication and performing regeneration only for the remaining regeneration time, a minimum of energy is required during resumption of the periodic control procedure.

What is claimed is:

1. A method of operating a microcomputer for controlling a gas adsorber of the kind having a first desiccant bed and a second desiccant bed, gas including vapor to be adsorbed being alternately directed by valves to pass through one of the beds providing adsorption of said vapor until its adsorption capacity is reached while the other desiccant bed is regenerated by the application of heat and purge gas for at most a predetermined regeneration time interval and is thereafter placed in an idle condition, said microcomputer executing a stored program for controlling said adsorber and having a watchdog timer for resetting the microcomputer to restart execution at an initial point in said program in the event that execution is disrupted, and having a non-volatile memory, said method providing recovery in the event that the execution is disrupted and including the steps of:

during the execution of said stored program, storing in said non-volatile memory an indication of which bed is providing adsorption of vapor and the time elapsed during regeneration, and after said initial point in said program and in response to said resetting of the microcomputer, reading the non-volatile memory to obtain said indication of the bed providing adsorption of vapor and baed on said indication of which bed is providing adsorption setting said valves to resume adsorption in the indicated bed, reading the non-volatile memory to obtain said time elapsed during regeneration, and based on said elapsed time selectively applying said heat and applying said purge gas in the event that said elapsed time does not exceed said regeneration time interal and removing the application of heat and the application of said purge gas in the event that said elapsed time exceeds said regeneration time.

2. A method of operating a microcomputer for controlling a gas adsorber of the kind having a first desiccant bed and a second desiccant bed, gas including vapor to be adsorbed being alternately directed by valves to pass through one of the beds providing adsorption of said vapor until its adsorption capacity is reached while the other desiccant bed is regenerated by the application of heat and purge gas for at most a predetermined regeneration time interval and is thereafter placed in an idle condition, said microcomputer executing a stored program for controlling said adsorber and having a watchdog timer for resetting the microcomputer to restart execution at an initial point in said program in the event that execution is disrupted, and having a non-volatile memory, said method providing recovery in the vent that the execution is disrupted and including the steps of:

during the execution of said stored program, storing in said non-volatile memory an indication of which bed is providing adsorption of vapor and the time elapsed during regeneration, and after said intitial point in said program and in response to said resetting of the microcomputer, reading the non-volatile memory to obtain said indication of which bed is providing adsorption of vapor and based on said indication of which bed is providing adsorption setting said valves to resume adsorption in the indicated bed, reading the non-volatile memory to obtain said time elapsed during regeneration, and based on said elapsed time selectively applying said heat and applying said purge gas in the event that said elapsed time does not exceed said regeneration time interval and removing the application of heat and the application of said purge gas in the event that said elapsed time exceeds said regeneration time, said microcomputer further including means for sensing whether said application of heat fails to be removed, and in the event that said application of heat fails to be removed, maintaining said application or purge gas in order to prevent overheating.

3. The method as claimed in claim 2, wherein said microcomputer is provided with a manual reset switch and a separate manual cycle start switch, and in response to manual activation of both the reset switch and cycle start switch, the microcomputer is reset and said non-volatile memory is set to indicate a predetermined initial state and to clear said elapsed regeneration time so as to start adsorption in a preselected one of the beds and to start regeneration at the beginning of said predetermined time interval.

4. The method as claimed in claim 2, wherein said gas dryer includes means for sensing whether regeneration has been completed prior to the expiration of said predetermined regeneration time interval, and wherein said method further includes the steps of:

during the execution of said stored program, removing the application of heat and purge gas before the expiration of said regeneration time interval in response to said means for sensing whether regeneration has been completed and recording in said non-volatile memory an indication that regeneration has been completed prior to the expiration of said regeneration time interval, and after said initial point in said program and in response to said resetting of the microcomputer, reading the non-volatile memory to obtain said indication that regeneration has been completed prior to the expiration of said regeneration time, and based on said indication selectively inhibiting regeneration in the event that regeneration had been completed prior to the expiration of said regeneration time.

5. A method of operating a microcomputer for controlling a gas adsorber of the kind having a first desiccant bed and a second desiccant bed, gas including vapor to be adsorbed being alternately directed by valves to pass through the first of the beds providing adsorption of said vapor until its adsorption capacity is reached while the second desiccant bed is regenerated by the application of heat and purge gas and thereafter the application of heat and purge gas is removed and the second desiccant bed is placed in an idle condition, said gas adsorber having means for sensing the completion of regeneration, asid microcomputer executing a stored program for controlling said adsorber and having a watchdog timer or resetting the microcomputer to restart execution at an initial point in said program in the event that execution is disrupted, and a non-voltatile memory, said method providing recovery in the event that the execution is disrupted and including the steps of:

during the execution of said stored program, storing in said non-volatile memory an indication of which bed is providing adsorption of vapor and whether the other bed has been regenerated and placed in said idle condition, and after said initial point in said program and in response to said resetting of the microcomputer, reading the non-volatile memory to obtain said indication of which bed is providing adsorption of vapor and based on said indication of the bed providing adsorption setting said valves to resume adsorption in the indicated bed, reading the non-volatile memory to obtain said indication of whether the other bed had been regenerated and placed in said idle condition, and based on said indication of whether the other bed had been regenerated selectively applying said heat and applying said purge gas in the event that regeneration of the other bed had not been completed, said microcomputer further including means for sensing whether said application of heat fails to be removed, and in the event that said application of heat fails to be removed, maintaining said application of purge gas in order to prevent overheating.

6. The method as claimed in claim 5, wherein said means for sensing whether regeneration has been completed includes a temperature switch responsive to the temperature of the effluent of said purge gas from the regenerating desiccant bed exceeding a predetermined temperature threshold.

7. The method as claimed in claim 5, wherein said microcomputer is provided with a manual reset switch and a separate manual cycle start switch, and in response to manual activation of both the reset switch and cycle start switch, the microcomputer is reset and said non-volatile memory is set to indicate a predetermined initial state so as to start adsorption in a preselected one of the beds and to start regeneration in the other of the beds.

8. The method as claimed in claim 5, wherein said method further includes the steps of:

during the execution of said stored program, storing in the non-volative memory an indication of the time elapsed during regeneration, and removing the application of heat and purge gas in the event that the time elapsed during regeneration exceeds a predetermined regeneration time interval, and after said initial point in said program and in response to said resetting of the microcomputer, reading the non-volatile memory to obtain said indication of the time elapsed during regeneration, so that regeneration is thereafter continued for at most the remainder of said regeneration time interval.

9. A method of operating a microcomputer for controlling a gas adsorber of the kind having a first desiccant bed and a second desiccant bed, gas including vapor to be adsorbed being alternately directed by valves to pass through one of the bed providing adsorption of said vapor until its adsorpotion capacity is reached while the other desiccant bed is regenerated by the application of heat and purge gas for at most a predetermined regeneration time interval and is therefter placed in an idle condition, said microcomputer executing a stored program for controlling said adsorber and having a matchdog timer for resetting the microcomputer to restart execution at an initial point in said program in the event that execution is disrupted, and having an non-volatile memory, said method providing recovery in the event that the execution is disrupted and including the steps of:

during the execution of said stored program, storing in said non-volatile memory an indication of which bed is providing adsorption of vapor and the time elapsed during regeneration, and after said initial point in said program and in response to said resetting of the microcomputer, reading the non-volatile memory to obtain said indication of which bed is providing adsorption of vapor and based on said indication of which bed is providing adsorption setting said valve to resume adsorption in the indicated bed, reading the non-volatile memory to obtain said time elapsed during regeneration, and based on said elapsed time selectively applying said heat and applying said purge gas in the event that said elapsed time does not exceed said regeneration time interval and removing the application of heat and the application of said purge gas in the event that said elapsed time exceeds said regeneration time, said method further including means for sensing whether regeneration has been completed prior to the expiration of said predetermined regeneration time interval, and wherein said method includes the steps of:

during the execution of said stored program, removing the application of heat and purge gas before the expiration of said regeneration time interval in response to said means for sensing whether regeneration has been completed and recording in said non-volatile memory an indication that regeneration has been completed prior to the expiration of said regeneration time interval, and after said initial point in said program and in response to said resetting of the microcomputer, reading the non-volatile memory to obtain said indication that regeneration has been completed prior to the expiration of said regeneration time, and based on said indicatieon selectively inhibiting regeneration in the vent that regeneration had been completed prior to the expiration of said regeneration time.

10. The method as claimed in claim 9, wherein said means for sensing whether regeneration is completed includes a temperature sensor responsive to the temperature of the effluent of said purge gas from the regenerating desiccant bed.

11. A method of operating a microcomputer for controlling a gas adsorber of the kind having a first desiccant bed and a second desiccant bed, gas including vapor to be adsorbed being alternately directed by valves toggled during a "switch" operation to pass through one of the beds providing adsorption of vapor while the other desiccant bed is regenerated by the application of heat and the circulation of purge gas during a "regen-heat" operation, cooled by the circulation of purge gas without the application of heat during a "regen-cool" operation, and placed in an idle condition without the application of heat or circulation of purge gas during a "hold" operation, said microcomputer executing a stored program for controlling said adsorber including a control loop for repetitively and sequentially controlling said operations, and having a watchdog timer for resetting the microcomputer to restart execution at an initial point in said program in the event that execution is disrupted, and having a non-volatile memory, said method providing recovery in the event that the execution is disrupted and including the steps of:

during the execution of said stored program, storing in said non-volatile memory an indication of which bed is providing adsorption of vapor and an indication of the specific one of said operations being controlled by said microcomputer, and after said initial point in said program and in response to said resetting of the microcomputer, reading the non-volatile memory to obtain the indication of which bed is providing adsorption and the indication of the specific one of said operations being performed when said execution was disrupted, based on said indication of the bed providing adsorption setting said valves to resume adsorption in the indicated bed, and based on said indication of the specific one of said operations entering said control loop at a selected one of a plurality of predefined entry points to complete said specific one of said operations and resume the repetitive and sequential controlling of said operations.

12. A method of operating a microcomputer for controlling a gas adsorber of the kind having a first desiccant bed and a seocnd desiccant bed, gas including vapor to be adsorbed being alternately directed by valves toggled during a "switch" operation to pass through one of the beds providing adsorption of vapor while the other desiccant bed is regenerated by the applicatioin of heat and the circulation of purge gas during a "region-heat" operation, cooled by the circulation of purge gas without the application of heat during a "regen-cool" operation, and placed in an idle condition without the application of heat or circulation of purge gas during a "hold" operation, said microcomputer executing a stored program for controlling said adsorber including a control loop for repetitiely and sequentially controlling said operations, and having a watchdog timer for resetting the microcomputer to restrart execution at an initial point in said program in the event that execution is disrupted, and having an non-volatile memory, said method providing recovery in the event that the execution is disrupted and including the steps of:

during the execution of said stored program, storing in said non-volatile memory an indication of which bed is providing adsorption of vapor and an indication of the specific one of said operations being controlled by said microcomputer, and after said initial point in said program and in response to said resetting of the microcomputer, reading the non-volatile memory to obtain the indication of which bed is providing adsorption and the indiation of the specific one of said operations being performed when said execution was disrupted, based on said indication of the bed providing adsorption setting said valves to resume adsorption in the indicated bed, and based on said indication of the specific one of said operations entering said control loop at a selected one of a plurality of predefined entry points to complete said specific one of said operations and resume the repetitive and sequential controlling of said operations, said method further comprising the steps of:

during the execution of said control loop for controlling each "regen-heat" operation, repetitively storing in said non-volatile memory an indication of the time elapsed since the start of the "regen-heat" operation, and terminating the "regen-heat" operation in response to said time elapsed since the start of the "regen-heat" operation reaching a predetermined regeneration time interval, and after said initial point in said program and in response to said resetting of the microcomputer, reading the non-volatile memory to obtain said time elapsed during regeneration when said execution was disrupted, and thereafter during execution of the control loop resuming and continuing the "regen-heat" operation for at most the remainder of said predetermined regeneration time interval.

13. The method as claimed in claim 12, wherein said microcomputer is provided with a manual cycle start switch, and in response to manual setting of the cycle start switch, the microcomputer is reset and said non-volatile memory is set to indicate a predetermined initial state so as to start adsorption in a preselected one of the beds and to start regeneration of the other of the beds.

14. The method as claimed in claim 12, wherein said microcomputer includes means for sensing whether said application of heat fails to be removed, and in the event that said application of heat fails to be removed, maintaining said application or purge gas in order to prevent overheating.

15. A method of operating a microcomputer for controlling a gas adsorber of the kind having a first desiccant bed and a second desiccant bed, gas including vapor to be adsorbed being alternately directed by valves toggled during a "switch" operation to pass through one of the beds providing adsorption of vapor while the other desiccant bed is exhausted to the atmosphere during a "dump" operation, regenerated by heat from a heater and air circulated through said other bed by a blower during a "regen-heat" operation, cooled by the circulation of air without the application of heat during a "regen-cool" operation, closed off from the atmosphere and repressurized with said gas during a "regen-pressurize" operation, and placed in an idle condition without the application of heat or circulation of air during a "hold" operation, said microcomputer executing a stored program for controlling said adsorber including a control loop for repetitively and sequentially control said operations, and having means for resetting the microcomputer to restart execution at an initial point in said program in the event that execution is disrupted, and having a non-volatile memory, said method providing recovery in the event that the execution is disrupted and including the steps of:

during execution of said stored program, storing in said non-volatile memory an indication of the specific one of said operations being controlled by said microcomputer and after said initial point in said program and in response to said resetting of the microcomputer, reading the non-volatile memory to obtain the indication of the specific one of said operations being performed when said execution was disrupted, and based on said indication entering said control loop at a selected one of a plurality of predefined entry points to complete said specific one of said operations and resume the repetitive and sequential controlling of said operations, said method further comprising the steps of:

during the execution of said control loop for controlling each "regen-heat" operation, repetitively storing in said non-volatile memory an indication of the time elapsed since the start of the "regen-heat" operation, and terminating the "regen-heat" operation in response to said time elapsed since the start of the "regen-heat" operation reaching a predetermined regeneration time interval, and after said initial point in said program and in response to said resetting of the microcomputer, reading the non-volatile memory to obtain said time elapsed during regeneration when said execution was disrupted, and thereafter during execution of the control loop resuming and continuing the "regen-heat" operation for at most the remainder of said predetermined regeneration time interval.

16. The method as claimed in claim 15, wherein said microcomputer includes means for sensing whether said blower fails to be turned off after said "regen-cool" operation, and in response to a failure of said blower to be turned off, commanding said blower to turn on and maintain the circulation of purge air in order to minimize potential damage to the blower.

17. The method as claimed in claim 15, wherein said microcomputer is provided with a manual reset switch and a separate manual cycle start switch, and in response to manual activation of both the reset switch and cycle start switch, the micrcomputer is reset and said non-volatile memory is set to indicate a predetermined initial state so as to start adsorption in a preselected one of the beds and to start regeneration of the other of the beds.

18. The method as claimed in claim 15, wherein said microcomputer includes means for sensing whether said heater fails to be turned off to remove said application of heat at the beginning of said "regen-cool" operation, and in response to a failure of said heater to be turned off, keeping said blower turned on to maintain the circulation of purge air in order to prevent overheating.

19. A method of operating a microcomputer for controlling a gas adsorber of the kind having a first desiccant bed and a second desiccant bed, gas including a vapor to be adsorbed being alternately directed by valves toggled during a "switch" operation to pass through one of the beds providing adsorption of vapor while the other desiccant bed is exhausted to the atmosphere during a "dump" operation, regenerated by heat from a heater and air circulated through said other bed by a blower during a "regen-heat" operation, cooled by the circulation of air without the application of heat during a "regen-cool" operation, closed off from the atmosphere and repressurized with said gas during a "regen-pressurize" operation, and placed in an idle condition without the application of heat or circulation of air during a "hold" operation, said microcomputer executing a stored program for controlling said adsorber including a control loop for repetitively and sequentially control said operations, and having means for resetting the microcomputer to restart execution at an initial point in said program in the event that execution is disrupted, and having a non-volatile memory, said method providing recovery in the event that the execution is disrupted and including the steps of:

during execution of said stored program, storing in said non-volatile memory an indication of the specific one of said operations being controlled by said microcomputer, and after said initial point in said program and in response to said resetting of the microcomputer, reading the non-volatile memory to obtain the indication of the specific one of said operations being performed when said execution was disrupted, and based on said indication entering said control loop at a selected one of a plurality of predefined entry points to complete said specific one of said operations and resume the repetitive and sequential controlling of said operations.

20. A method of operating a microcompuer for controlling a gas adsorber of the kind having a first desiccant bed and a second desiccant bed, gas including vapor to be adsorbed being directed by valves to pass through the first bed providing adsorption of vapor while the second desiccant bed is regenerated by the application of heat provided by an electrical heater and the circulation of purge gas through the second desiccant bed and thereafter the second desiccant bed is placed on hold during which the application of heat and circulation of purge gas is discontinued, the valves alternately switching the flow through the first and second beds upon completion of an adsorption cycle, said heater being normally turned on and off by said microcomputer commanding a power regulating device to close and open a circuit from a source of electrical power to said heater, and a power sensor being provided to sense the application of power to said heater and to feed back to said microcomputer an indication of said applied power, said method of operating said microcomputer comprising executing a stored program for:

commanding said power regulating device to close and apply power to said heater for the application of heat to the bed being regenerated, commanding said power regulating device to open and remove the power applied to said heater for placing the bed being regenerated on hold, after a sufficient time for said power regulating device to respond under normal conditions obtaining said indication of said power fed back to said microcomputer, and in the event that said indication indicates that power is still applied to said heater, maintaining said circulation of purge gas to prevent damage due to overheating.

21. The method as claimed in claim 20 wherein the application of power to said heater is sensed by an opto-isolator excited by the voltage applied to said heater.

22. A method of operating a microcomputer for controlling a gas adsorber of the kind having a first dissicant bed and a second desiccant bad, gas including vapor to be adsorbed being alternately directed by valves to pass through the first of the beds providing adsorption while the the second desiccant bed is regenerated by the application of heat and the circulation of purge air by a blower and thereafter the second desiccant bed is placed on hold during which the application of heat and circulation of purge air is discontinued, said blower being driven by an electrical motor normally being turned on and off by said microcomputer commanding a power regulating device to close and open a circuit from a source of electrical power to said motor, and a power sensor being provided to sense the application of power to said motor and to feed back to said microcomputer an indication of said applied power, said method of operating said microcomputer comprising executing a stored program for:

commanding said power regulating device to close and apply power to said motor for circulating purge air to the bed being regenerated, commanding said power regulating device to open and remove the power applied to the motor for placing said other desiccant bed on hold, after a sufficient time for said power regulating device to respond under normal conditions, obtaining said indication of said power fed back to said microcomputer, and in the event that said indication indicates that power is still applied to said motor, commanding said power regulating device to close to prevent possible damage to said motor and said power regulating device.

23. A method of operating a microcomputer for controlling a gas adsorber of the kind having a first desiccant bed and a second desiccant bed, gas including vapor to be adsorbed being alternately directed by valves to pass through the first of the beds providing adsorption of said vapor until its adsorption capacity is reached while the second desiccant bed is regenerated by the application of heat and purge gas and thereafter the application of heat and purge gas is removed and the second desiccant bed is placed in an idle condition, said gas adsorber having means for sensing the completion of regeneration, said microcomputer executing a stored program for controlling said adsorber and having a watchdog timer for resetting the microcomputer to restart execution at an initial point in said program in the event that execution is disrupted, and a non-volatile memory, said method providing recovery in the event that the execution is disrupted and including the steps of:

during the execution of said stored program, storing in said non-volatile memory an indication of which bed is providing adsorption of vapor and whether the other bed had been regenerated and placed in said idle condition, and after said initial point in said program and in response to said resetting of the microcomputer, reading the non-volatile memory to obtain said indication of the bed providing adsorption of vapor and based on said indication of which bed is providing adsorption setting said valves to resume adsorption in the indicated bed, reading the non-volatile memory to obtain said indication of whether the other bed has been regenerated and placed in said idle condition, and based on said indication of whether the other bed had been regenerated selectively applying said heat and applying said purge gas in the event that regeneration of the other bed has not been completed.

* * * * *

UNITED STATES PATENT AND TRADEMARK OFFICE
CERTIFICATE OF CORRECTION

PATENT NO. : 4,718,020  Page 1 of 3
DATED : January 5, 1988
INVENTOR(S) : Michael B. Duich et al.

It is certified that error appears in the above-identified patent and that said Letters Patent is hereby corrected as shown below:

<u>In the Claims:</u>

Col. 18, claim 1, l. 52, delete "interal" and substitute --interval--

Col. 19, claim 2, l. 3, delete "vent" and substitute --event--

Col. 19, claim 2, l. 28, delete "or" and substitute --of--

Col. 20, claim 5, l. 3, delete "asid" and substitute --said--

Col. 20, claim 5, l. 5, delete "or" and substitute --for--

Col. 20, claim 5, l. 7, delete "voltatile" and substitute --volatile--

Col. 20, claim 5, l. 14, delete "has" and substitute --had--

Col. 20, claim 9, l. 68, delete "bed" and substitute --beds--

Col. 21, claim 9, l. 4, delete "therefter" and substitute --thereafter--

Col. 21, claim 9, l. 7, delete "matchdog" and substitute --watchdog--

Col. 21, claim 9, l. 10, delete "an" and substitute --a--

UNITED STATES PATENT AND TRADEMARK OFFICE
CERTIFICATE OF CORRECTION

PATENT NO. : 4,718,020

DATED : January 5, 1988

INVENTOR(S) : Michael B. Duich, et al.

It is certified that error appears in the above-identified patent and that said Letters Patent is hereby corrected as shown below:

Col. 21, claim 9, l. 22, delete "valve" and substitute --valves--

Col. 21, claim 9, l. 50, delete "indicatieon" and substitute --indication--

Col. 21, claim 9, l. 51, delete "vent" and substitute --event--

Col. 22, claim 12, l. 33, delete "seocnd" and substitute --second--

Col. 22, claim 12, l. 39, delete "region-heat" and substitute --"regen-heat"--

Col. 22, claim 12, l. 45, delete "repetitiely" and substitute --repetitively--

Col. 22, claim 12, l. 48, delete "restrart" and substitute --restart--

Col. 22, claim 12, l. 49, delete "an" and substitute --a--

Col. 22, claim 12, ll. 61 and 62, delete "indiation" and substitute --indication--

Col. 24, claim 19, l. 47, delete "a", second occurrence

Col. 25, claim 20, l. 15, delete "microcompuer" and substitute --microcomputer--

UNITED STATES PATENT AND TRADEMARK OFFICE
CERTIFICATE OF CORRECTION

PATENT NO. : 4,718,020
DATED : January 5, 1988
INVENTOR(S) : Michael B. Duich, et al.

It is certified that error appears in the above-identified patent and that said Letters Patent is hereby corrected as shown below:

Col. 25, claim 22, ll. 54 and 55, delete "dissicant" and substitute --desiccant--

Col. 25, claim 22, l. 56, delete "bad" and substitute --bed--

Col. 26, claim 23, l. 57, delete "has" and substitute --had--

Col. 26, claim 23, l. 61, delete "has" and substitute --had--

Signed and Sealed this

Fourth Day of October, 1988

Attest:

DONALD J. QUIGG

Attesting Officer

Commissioner of Patents and Trademarks